US012749372B2

(12) United States Patent
Keilwert et al.

(10) Patent No.: US 12,749,372 B2
(45) Date of Patent: Sep. 29, 2026

(54) NON-FUNGIBLE TOKEN SERIES COLLECTION IN A GAMING ENVIRONMENT

(71) Applicant: IGT, Las Vegas, NV (US)

(72) Inventors: Stefan Keilwert, St. Josef (AT); Sven Aurich, Schwanberg (AT)

(73) Assignee: IGT, Las Vegas, NV (US)

( * ) Notice: Subject to any disclaimer, the term of this patent is extended or adjusted under 35 U.S.C. 154(b) by 321 days.

(21) Appl. No.: 18/377,673

(22) Filed: Oct. 6, 2023

(65) Prior Publication Data

US 2025/0118157 A1 Apr. 10, 2025

(51) Int. Cl.
*G07F 17/32* (2006.01)
*G06Q 20/36* (2012.01)

(52) U.S. Cl.
CPC ......... *G07F 17/3244* (2013.01); *G06Q 20/36* (2013.01); *G07F 17/3225* (2013.01); *G07F 17/3267* (2013.01); *G06Q 2220/00* (2013.01)

(58) Field of Classification Search
CPC ............. G07F 17/3244; G07F 17/3225; G07F 17/3267; G07F 17/3255; G06Q 20/36; G06Q 2220/00; G06Q 20/065; G06Q 30/0209
See application file for complete search history.

(56) References Cited

U.S. PATENT DOCUMENTS 9,830,775 B2 * 11/2017 Gelber .................... G07F 17/34
11,189,131 B1 * 11/2021 Weiksner ........... G06Q 20/4016
12,288,445 B2 * 4/2025 Hufnagl-Abraham ....................... G07F 17/3251
2009/0124351 A1 * 5/2009 DeWaal .................. G07F 17/32 463/40
2010/0016065 A1 * 1/2010 Nicely ................ G07F 17/3244 463/25
2012/0214580 A1 * 8/2012 Hoffman ............. G07F 17/3225 463/42
2017/0294077 A1 * 10/2017 Gelber .................... G07F 17/34
2019/0130698 A1 * 5/2019 Simons ............... G07F 17/3241
2021/0133700 A1 * 5/2021 Williams ........... G06Q 20/3829
2022/0383295 A1 * 12/2022 Cox ..................... G06Q 20/367
2023/0013623 A1 * 1/2023 Cleveland ........... G07F 17/3288
2023/0079127 A1 * 3/2023 Benedetto ............... A63F 13/79
2023/0117399 A1 * 4/2023 Jakobsson ............ G06Q 50/184 705/310
2023/0119838 A1 * 4/2023 Meyers ................... A63F 13/71 463/42
2023/0241514 A1 * 8/2023 Dalmia ................... A63F 13/69 463/40
2023/0298435 A1 * 9/2023 Dalmia ............... G07F 17/3241 463/42
2024/0062621 A1 * 2/2024 Hufnagl-Abraham .... H04L 9/50
2024/0075392 A1 * 3/2024 Jaffe ..................... A63F 13/792
2024/0127675 A1 * 4/2024 Springer ................. G07F 17/34
2024/0242568 A1 * 7/2024 Tietzen .................. G06Q 50/34
2024/0403957 A1 * 12/2024 Boneta .................. H04L 9/0643
2025/0118157 A1 * 4/2025 Keilwert ............. G07F 17/3244

* cited by examiner

*Primary Examiner* — Seng H Lim
(74) *Attorney, Agent, or Firm* — Sheridan Ross P.C.

(57) ABSTRACT

A networked computer system for enabling players of a gaming device to collect a series of Non-Fungible Tokens (NFTs). Computational power of the networked computer system is also leveraged to support the recordation of NFT transactions, including the acquisition of NFT transactions and the transfer of NFTs.

20 Claims, 13 Drawing Sheets

*Fig. 7*
700
704
708a
708b
708c
My Tokens
LEGENDARY COLLECTION
NEW
5
LEGENDARY
LEGENDARY
LEGENDARY
The Magic Dragon

*Fig. 8*
700
708c
708b
708a
LEGENDARY COLLECTION
LEGENDARY
Mysterious Lamp
LEGENDARY
The Magic Dragon
NEW
LEGENDARY
Wan Shi Ru Yi

NON-FUNGIBLE TOKEN SERIES COLLECTION IN A GAMING ENVIRONMENT

BACKGROUND

The present disclosure is related to networked computer systems and, more particularly, to gaming devices and gaming systems.

Current gaming devices and Electronic Gaming Machines (EGMs) are managed in the context of a large computational network. Operating such a large computational network comes with disadvantages, including network downtime, operational costs, and network maintenance. From the perspective of a casino operator, simply offering more money to players of gaming devices and EGMs only increases these complexities.

BRIEF SUMMARY

Finding a way to leverage a large computational network to support additional gameplay functionality and features would provide the casino operator with benefits not previously realized. In certain embodiments, the present disclosure relates to a gaming system that facilitates the acquisition of Non-Fungible Tokens (NFTs).

In some embodiments, a system is provided that includes: a processor; and computer memory coupled with the processor, the computer memory comprising data stored thereon that, when executed by the processor, causes the processor to: determine that a game event has occurred during a game of chance; determine that the game event corresponds to a Non-Fungible Token (NFT)-earning event and that a player playing the game of chance when the game event occurred is eligible to receive a first NFT based on the occurrence of the game event, where the first NFT is one of multiple NFTs belonging to an NFT collection; receive an input from the player indicating a desire to redeem the first NFT; query a digital wallet associated with the player; determine, based on a response to the query, that the digital wallet did not contain the first NFT prior to receiving the input from the player; and in response to determining that the digital wallet did not contain the first NFT prior to receiving the input from the player, initiate a transaction that causes the first NFT to be stored in the digital wallet associated with the player and information describing the first NFT to be recorded to a digital ledger.

In some embodiments, a method is provided that includes: determining, with a processor, that a game event has occurred during a game of chance; determining, with the processor, that the game event corresponds to a Non-Fungible Token (NFT)-earning event and that a player playing the game of chance when the game event occurred is eligible to receive a first NFT based on the occurrence of the game event, where the first NFT is one of multiple NFTs belonging to an NFT collection; querying a digital wallet associated with the player; determining, with the processor and based on a response to the query, that the digital wallet did not contain the first NFT prior to receiving the input from the player; and in response to determining that the digital wallet did not contain the first NFT prior to receiving the input from the player, initiating a transaction that causes the first NFT to be stored in the digital wallet associated with the player and information describing the first NFT to be recorded to a digital ledger.

In some embodiments, an EGM is provided that includes: a processor; and computer memory coupled with the processor, the computer memory comprising data stored thereon that, when executed by the processor, causes the processor to: determine that a game event has occurred; determine that the game event corresponds to a Non-Fungible Token (NFT)-earning event and that a player playing the game of chance when the game event occurred is eligible to receive an NFT based on the occurrence of the game event, where the NFT is one of multiple NFTs belonging to an NFT collection; determine that the digital wallet did not contain the NFT prior to the game event occurring; and in response to determining that the digital wallet did not contain the NFT prior to the game event occurring, initiate a transaction that causes the NFT to be stored in the digital wallet associated with the player.

In some embodiments, a system is provided that includes: a processor; and computer memory coupled with the processor, the computer memory comprising data stored thereon that, when executed by the processor, causes the processor to: render a display of a digital wallet, wherein the digital wallet presents a Non-Fungible Token (NFT) collection cable of being earned by a player; present, via the display of the digital wallet, an indicator showing whether an NFT in the NFT collection has been redeemed by the player or not; and present, via the display of the digital wallet, a requirement for earning and redeeming an NFT in the NFT collection that has not yet been redeemed by the player, wherein the requirement refers the player to a game of chance in which the NFT can be earned.

Additional features and advantages are described herein and will be apparent from the following Description and the figures.

DETAILED DESCRIPTION

Figure 1:
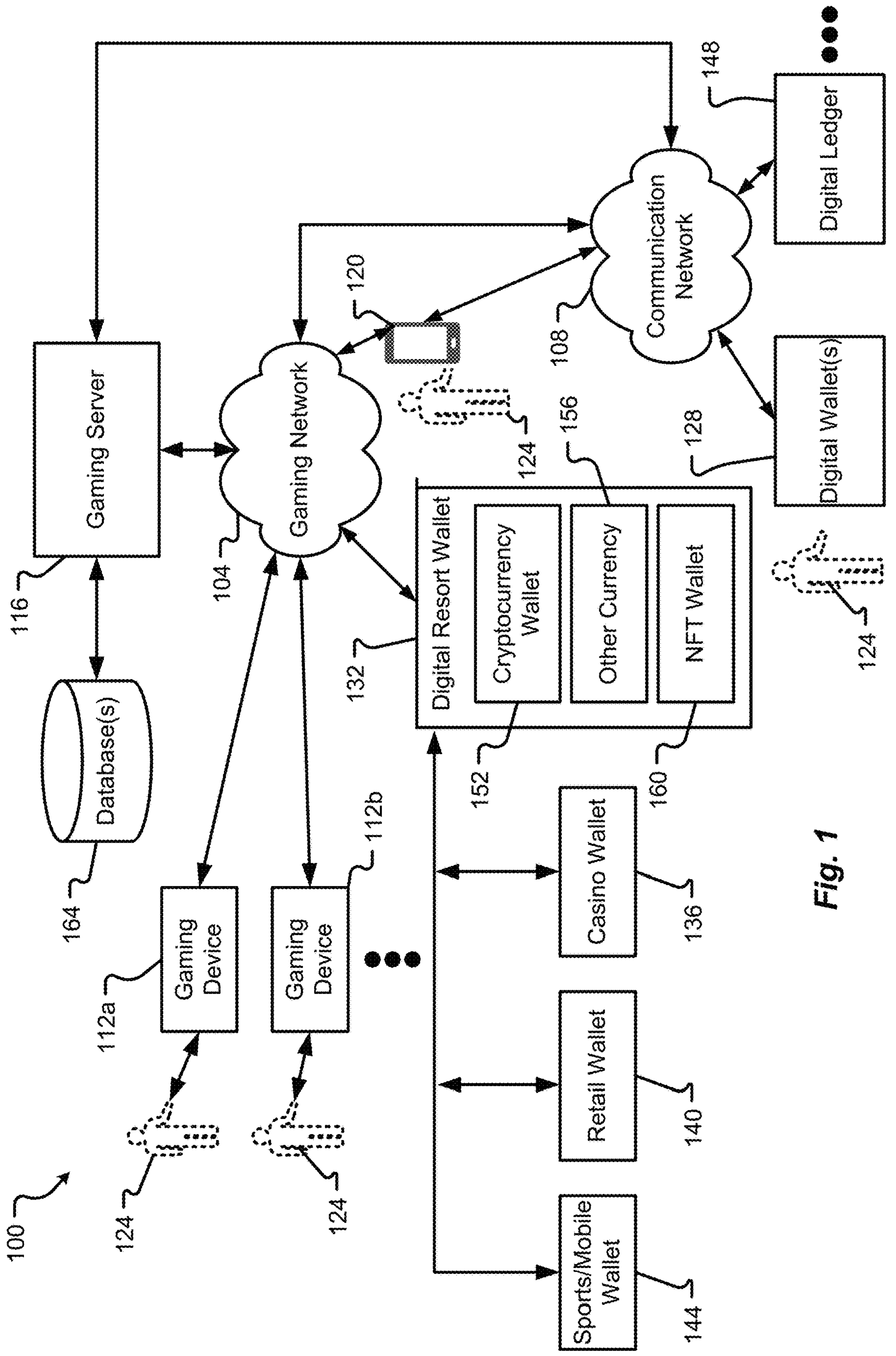
FIG. 1 is a block diagram of a gaming system in accordance with embodiments of the present disclosure.

From a casino perspective, creating cost effective player rewards (compared to monetary player loyalty rewards, vouchers, etc.) which lead to cost saving opportunities for the operator are highly desirable. It is also desirable to offer rewards that leverage the larger computational network that is owned and operated by the casino operator.

If game-specific NFTs are offered, players would focus on playing the one game they like most. The number of available NFTs within each game could be limited. Thus, once a player collected all (or at least the most important) NFTs of one game, they might no longer be interested in playing that game, as they have encountered each situation the game can provide. Furthermore, players might come to the situation "Now that I have achieved everything in game A, I would need to find a completely new game to get started with."

Existing solutions that try to draw a player from one game to another (such as achievement-like mechanisms) require the player to participate in specialized achievement-like bonus programs/apps/databases/ . . . to track player progresses. Finally, existing cross-game attracting solutions are rather difficult to implement; they need a funding pot, which can be difficult to implement on a number of technical and business levels.

Embodiments of the present disclosure, however, aim to attract players to collecting multiple or all NFTs out of a series or collection of NFTs, within one game or across multiple games. Each of the NFTs may be associated to one specific game (or game series) and can be earned/used in the specific game (or game series) it belongs to. However, completing the NFT series or collection (at least to a certain extent), may enable new, additional benefits for the player/owner. As a non-limiting example, collecting a series of NFTs may enable the player to redeem a gameplay feature such as "Collect 1 high tier NFT of each game of the series to unlock game feature A, B, or C."

Thus, a player might be engaged to collect all NFTs within the series (NFT persistence) instead of just playing the game for the one single session. Introducing an NFT series or collection also gives the manufacturer/operator the chance to draw players to particular games selected by the manufacturer/operator.

Embodiments of the present disclosure leverage many technical aspects of the gaming network. In particular, supporting the utilization of NFTs and NFT collections within a gaming network requires access to digital wallet technology, NFT management technology, and the digital ledger(s) on which NFT-related transactions can be recorded.

As a non-limiting example, game symbols can be minted as NFTs. Depending on the NFT's value in the game, they are assigned an NFT tier (e.g., common (tier 1), uncommon (tier 2), rare (tier 3), epic (tier 4), or legendary (tier 5)). The player can win these NFTs in addition to regular cash wins while playing a game of chance (e.g., slot game, video poker game, etc.).

In a non-limiting example, a player may be allowed to play a game of chance, such as a slot game. During interactions with the game of chance, the player may be eligible to win cash or credit. Any eligible cash win or other type of game event can trigger an additional NFT reward. By scanning the NFT reward with the player's mobile device, the NFT can be added to the player's digital wallet. Addition of the NFT to the player's digital wallet may occur automatically (e.g., without receiving player input after the NFT has been earned) or with permission of the player (e.g., by receiving player input after the NFT has been earned). In some embodiments, the automated redemption of the NFT may be facilitated by the player indicating a desire for automated NFT redemption when game events allow, thereby enabling the player to continue interacting with the game of chance without further interruption. In other words, the player may have a predefined preference (e.g., within the game of chance or within a player profile) that indicates to the game of chance how to handle NFTs when earned (e.g., whether to enable automated or non-automated redemption of new NFTs). The player's digital wallet may be configured to display all NFTs owned by the player. The digital wallet might be leveraging digital ledger technology (e.g., a blockchain) or a simple database.

When a player opens their digital wallet, a "collection frame" is shown. The collection frame is "deactivated" and low-lighted. The collection frame shows required symbols to be collected, at this point they are greyed out and are not activated. In an example, collection frames can be made available by the operator of a gaming device, by a manufacturer of the game of chance, by an operator of the digital wallet, etc., depending on various eligibility conditions (e.g., previous achievements, event triggered, season, etc.).

Embodiments of the present disclosure may also support top tier "Legendary" NFTs for one or multiple different games of chance. Once a player has earned such a top "Legendary" NFT, the respective greyed-out symbol in the collection frame may become activated (e.g., lit up, no longer transparent, etc.) by inserting the earned Legendary NFT into the frame. Embodiments disclosed herein aim to engage the player to play all supported games of the "Legendary Collection" and collect each of their top "Legendary NFTs." Once the "Legendary Collection" is complete, the corresponding NFT collection may be activated (e.g., an entire frame is lit up) and can be used for further activities/player eligibilities. The complete "Legendary Collection" may provide the player with more/better gameplay benefits compared to the sum of each single NFT of the NFT collection.

Embodiments of the present disclosure will be described in connection with a gaming device having a capability to enable NFT collection and to adjust gameplay features based on NFTs that have been earned and redeemed by the player (e.g., that are stored in the player's digital wallet). While certain embodiments of the present disclosure will reference the use of gaming devices, such as an Electronic Gaming Machine (EGM), Electronic Gaming Table (EGT), lottery vending machine, virtual gaming machine, or video gaming gambling machine (VGM), as a device that facilitates such capabilities, it should be appreciated that embodiments of the present disclosure can be used with any computer-controlled gaming device or collection of gaming devices or other devices controlled by a gaming server.

With reference initially to FIG. 1, details of an illustrative gaming system 100 will be described in accordance with at least some embodiments of the present disclosure. The components of the gaming system 100, while depicted as having particular instruction sets and devices, is not necessarily limited to the examples depicted herein. Rather, a system 100 according to embodiments of the present disclosure may include one, some, or all of the components depicted in the system 100 and does not necessarily have to include all of the components. For instance, the components may be distributed amongst a plurality of servers and/or gaming devices (e.g., an EGM, etc.) without departing from the scope of the present disclosure. The illustration of a single central gaming server 116 is for ease of discussion and should not be construed as limiting embodiments of the present disclosure to a single-server architecture.

The gaming system 100 is shown to include a gaming network 104 and a communication network 108. The gaming network 104 may correspond to a distributed set of devices that interconnect and facilitate machine-to-machine communications between one or multiple gaming devices 112*a*, 112*b*, . . . , a mobile device 120, one or more player digital wallets 128, a digital ledger 148, and one or more databases 164. The digital resort wallet 132 may encapsulate or include one or more of a casino wallet 136, a retail wallet 140, and/or a sports/mobile wallet 144.

The communication network 108 may correspond to a distributed set of devices that interconnect and facilitate machine-to-machine communications between the components of the gaming system 100 and external components including the mobile device 120, digital wallet(s) 128 and digital ledger 148. In some embodiments, the gaming network 104 and communication network 108 may correspond to different networks administered and/or maintained by different entities. In such a scenario, one or more of a gateway, firewall, or similar network border device may reside between the gaming network 104 and the communication network 108 (e.g., to maintain security preferences/settings of each network). In another possible scenario, the gaming network 104 and communication network 108 may correspond to the same or similar network. As a non-limiting example of the second scenario, the gaming network 104 and communication network 108 may both correspond to a distributed Internet Protocol (IP)-based communication network, such as the Internet.

The gaming network 104 and communication network 108 may include any type of known communication medium or collection of communication media and may use any type of protocols to transport messages between devices. As some non-limiting examples, the gaming network 104 may correspond to a WAN or LAN in which the plurality of gaming devices 112*a*, 112*b*, . . . are configured to communicate with the gaming server 116 using devices that are owned and administered by the same entity that administers security settings of the gaming devices 112*a*, 112*b*, . . . . As such, the gaming network 104 may be considered a secure or trusted network.

The communication network 108, in some embodiments, may also include a WAN or LAN. Alternatively or additionally, the communication network 108 may include one or more devices that are not administered by the same entity administering the gaming devices 112*a*, 112*b*, . . . . Thus, the communication network 108 may be considered an untrusted or unsecure network from the perspective of the gaming network 104. The Internet is an example of the communication network 108 that constitutes an IP network consisting of many computers, computing networks, and other communication devices located all over the world, which are connected through many telephone systems and other means. Other examples of the communication network 108 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 108 may be administered by a Mobile Network Operator (MNO) whereas a casino entity may administer the gaming network 104.

It should be appreciated that the gaming network 104 and/or communication network 108 need not be limited to any one network type, and instead may be comprised of a number of different networks and/or network types. Moreover, the gaming network 104 and/or communication network 108 may comprise a number of different communication media such as coaxial cable, copper cable/wire, fiber-optic cable, antennas for transmitting/receiving wireless messages, wireless access points, routers, and combinations thereof.

In some embodiments, the gaming devices 112*a*, 112*b*, . . . may be distributed throughout a single property or premises (e.g., a single casino floor) or the gaming devices 112*a*, 112*b*, . . . may be distributed among a plurality of different properties. In a situation where the gaming devices 112*a*, 112*b*, . . . are distributed in a single property or premises, the gaming network 104 may include at least some wired connections between network nodes (e.g., a LAN or multiple LANs). As a non-limiting example, the nodes of the gaming network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 112*a*, 112*b*, . . . may utilize the same or different types of communication protocols to connect with the gaming network 104. It should also be appreciated that the gaming devices 112*a*, 112*b*, . . . may or may not present the same type of game to a player 124. It should be appreciated that a gaming device 112*a*, 112*b*, . . . may correspond to one example of a gaming device. It should also be appreciated that the functions and features described in connection with a gaming device 112*a*, 112*b*, . . . may be provided in any other type of gaming device without departing from the scope of the present disclosure. Mobile devices 120 may also be considered to have functionality of a gaming device 112*a*, 112*b*, . . . , and vice versa.

In some embodiments, the gaming devices 112*a*, 112*b*, . . . may be configured to communicate with a centralized management server in the form of the gaming server 116. The gaming server 116 may be configured to manage games of chance, games of skill, or hybrid games of chance/skill played at the gaming devices 112*a*, 112*b*, . . . and/or mobile devices 120 (e.g., slot games, video poker games, lottery games, keno games, etc.), enable execution of a different game (e.g., a card game), monitor player 124 activity at the gaming devices 112*a*, 112*b*, . . . , track player 124 association with a gaming device 112, track player 124 utilization of mobile devices 120, track player 124 gaming sessions at the gaming devices 112*a*, 112*b*, . . . , and/or mobile devices 120, facilitate communications with players 124 via the gaming devices 112*a*, 112*b*, . . . , and/or perform any other task in connection with games played by a player 124 at gaming devices 112*a*, 112*b*, . . . and/or mobile devices 120.

It should be appreciated that the gaming server 116 may or may not be co-located with the gaming devices 112. Thus, one or more gaming devices 112*a*, 112*b*, . . . may communicate with the gaming server 116 over a WAN, such as the Internet. In such an event, a tunneling protocol or Virtual Private Network may be established over some of the communication network 108 to ensure that communications between a gaming device 112*a*, 112*b*, . . . and a remotely-located gaming server 116 are secured.

System 100 also contemplates the possibility of some personal gaming mobile devices 120 (e.g., smart phones, tablet computers, etc.) being paired with a gaming device 112*a*, 112*b*, . . . , thereby enabling communications to flow between the personal gaming mobile device 120 on the one hand and the gaming device(s) 112*a*, 112*b*, . . . on the other. This communication may utilize a proximity-based communication protocol, such as Bluetooth, BLE, NFC, WiFi, etc. One or more personal gaming devices (e.g., a mobile device 120) of the player 124 may not necessarily be paired with a gaming device 112*a*, 112*b*, . . . , but such personal gaming devices may still be configured to communicate with the gaming server 116 via the communication network 108. Communications between the gaming device 112*a*, 112*b*, . . . and personal gaming mobile device may facilitate any number of combinations of gameplay opportunities.

The gaming server 116 is in communication, via the gaming network 104, with one or more databases 164. The database(s) 164 may be configured to store one or multiple data structures (which can include the digital resort wallet 132, casino wallet 136, retail wallet 140, and sports/mobile wallet 144) that are used in connection with interactive gaming activities of players 124 and the gaming system 100. Alternatively or additionally, the database(s) 164 may be configured to store profile information for the player 124, thereby enabling enhanced gameplay opportunities for the player 124 within the system 100. The database(s) 164 can use any database model and compatible database management system. Examples of database models include relational databases, object-oriented databases, and non-relational databases, such as NoSQL and NewSQL databases.

In various embodiments, a gaming establishment fund management function in the gaming server 116 that includes one or more cashless wagering systems that are each associated with or otherwise maintain one or more cashless wagering accounts. In certain embodiments, the gaming establishment fund management function includes a first cashless wagering system that maintains a first cashless wagering account, in which a player utilizes a mobile device 120 application or app running on a mobile device 120 to facilitate the electronic transfer of any funds between the first cashless wagering account and a gaming device 112. For example, as seen in FIG. 1, a digital resort wallet 132 or enterprise wallet includes or is otherwise in communication with a sports/mobile wallet 144 (i.e., a first cashless wagering account maintained by a first cashless wagering function) accessible via the mobile device 120 running a mobile device application as described herein.

In certain embodiments, the gaming establishment fund management system additionally or alternatively includes a second cashless wagering function that maintains a second cashless wagering account associated with a physical instrument, such as a player issued magnetic striped card. In these embodiments, a player utilizes the physical instrument (e.g., via inserting the card into a player tracking unit associated with a gaming device) to facilitate the electronic transfer of any funds between this second cashless wagering account and the gaming device. Continuing with the example, as seen in FIG. 1, the resort or enterprise wallet 132 also includes or is otherwise in communication with a casino wallet 136 (i.e., a second cashless wagering account maintained by a second cashless wagering function) accessible via a physical instrument, such as a player issued magnetic striped card associated with the second cashless wagering function or a mobile device 120 associated with the second cashless wagering function.

In various embodiments, in addition to or an alternative of maintaining one or more cashless wagering accounts via one or more cashless wagering functions, the gaming establishment fund management function includes one or more gaming establishment retail functions that each maintain one or more gaming establishment retail accounts. Such a gaming establishment retail account (i.e., a gaming establishment retail wallet 140) integrates with various retail point-of-sale systems throughout the gaming establishment to enable players to purchase goods and/or services via the player's gaming establishment retail account. Continuing with this example, as seen in FIG. 1, the resort or enterprise wallet 132 further includes or is otherwise in communication with the retail wallet 140 (i.e., a gaming establishment retail account maintained by a gaming establishment retail function) accessible via a point-of-sale terminal associated with a gaming establishment.

In various embodiments, the digital resort wallet 132 and/or player's digital wallet 128 may include or comprise one or more cryptocurrency wallet(s) 152, other currency 156, and an NFT wallet 160. As will be described in further detail herein, the NFT wallet 160 may be used to store one or more NFTs that have been earned and redeemed by player 124. In some embodiments, each NFT earned and redeemed by the player 124 may correspond to a minted game symbol that corresponds to a particular game that is playable on a gaming device 112*a*, 112*b*, . . . , and/or mobile device 120. One or more NFTs stored in the NFT wallet 160 may be associated with a particular game or series of games. One or more NFTs may also be used to unlock or enable particular gameplay features within a game or series of games. It should be appreciated that the contents of the digital wallet(s) 128, 132 may be maintained separately, meaning that the cryptocurrency wallet 152 may be maintained separately from the other currency 156, which may be maintained separately from the NFT wallet 160. Financial implementations facilitated by the cryptocurrency wallet 152 and other currency 152 could happen independently from the game as NFT minting does not cost much but can create high rewards. The "minter" (operator/manufacturer) could participate in each cross-game NFT transaction, through which the costs associated with the NFT minting process could be covered by the benefits realized within the game. While NFTs will be described as being associated with a particular game (e.g., earnable and redeemable while playing a particular game, then useable for unlocking gameplay features within the particular game), it should be appreciated that NFTs can also be used to support cross-game behaviors and achievements. For instance, an NFT that is earnable and redeemable within one game, may unlock gameplay features within another, different, game. Further still, an NFT collection may contain NFTs all associated with a particular game or an NFT collection may contain NFTs associated with two or more different games without departing from the scope of the present disclosure.

In certain embodiments, the digital resort wallet 132 account associated with a player 124 includes one or more gaming establishment cryptocurrency accounts associated with respective cryptocurrency blockchain networks. For example, the digital resort wallet 132 associated with the player 124 can include a gaming establishment bitcoin account associated with the player and a gaming establishment Ethereum account associated with the player.

The gaming server 116, gaming devices 112, mobile device 120, and digital resort wallet(s) 128,132 are in communication, via communication network 108. The digital ledger 148 is commonly a distributed ledger (also called a shared ledger or distributed ledger technology or DLT) that is a consensus of replicated, shared, and synchronized digital data geographically spread across multiple spatial locations. Unlike a centralized database, there is commonly no central administrator for a digital ledger 148. The digital ledger 148 can employ Replicated Journal Technology, since the information is replicated in the nodes containing a full copy of the information and the information in the blocks is included in timely order, more in the form of an accounting journal than as an accounting ledger. In some embodiments, the digital ledger 148 is a blockchain distributed ledger. The digital ledger 148 may be permissioned or permissionless and employ one or more consensus algorithms, e.g., proof of work, proof of stake, hybrids thereof, and hashgraph. The digital ledger 148 may be minable (one can claim ownership of new coins contributing with a node) and can be a non-blockchain DLT that can be in the form of a distributed cryptocurrency. While blockchain requires global consensus across all nodes, a non-blockchain DLT can achieve consensus without having to validate across the entire blockchain.

Thus, it should be appreciated that in this embodiment, the cryptocurrency wallet 170 or NFT wallet 160 (and/or the gaming establishment fund management function) is in communication with each of the respective digital ledgers 148 for which the gaming establishment cryptocurrency wallet 152 includes a corresponding gaming establishment cryptocurrency and/or NFT account. Moreover, to facilitate the transferring of cryptocurrency and/or NFTs between digital wallets 128, 132 of a player 124 or between different players 124, the digital ledger 148 may be utilized and processing capabilities of devices within the system 100 may be used to validate transactions on the digital ledger 148. It should be appreciated that in various embodiments, a person may not need to "register" an account with his or her external digital ledger 148.

In general, to transfer funds and/or NFTs between different accounts, a transaction request is created and submitted to the respective cryptocurrency digital ledger 148 by the digital wallet (and/or the mobile device application) initiating the transfer. The transaction request includes (amongst other information) (1) a source account identifier (e.g., a public key of a source wallet) (2) a destination account identifier (e.g., a public key of a destination wallet), (3) a transfer type identifier (i.e., a deposit (or transfer-in) or a withdrawal (or transfer-out), and (4) an identifier of the object being transferred (e.g., an NFT identifier and/or amount of cryptocurrency to be transferred.

Figure 2:
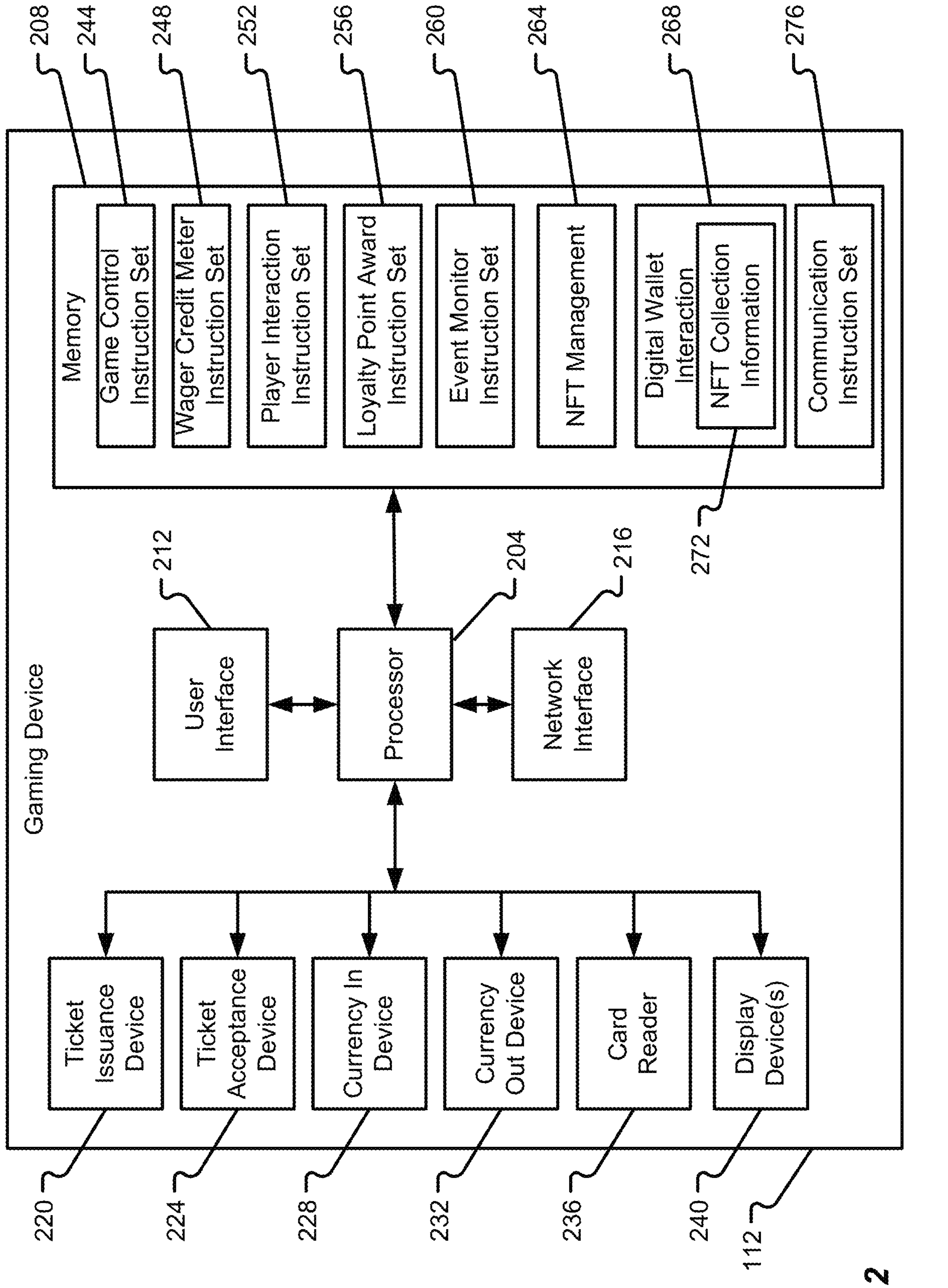
FIG. 2 is a block diagram depicting a gaming device in accordance with embodiments of the present disclosure.

With reference to FIG. 2, additional details of the components that may be included in a gaming device 112 will be described in accordance with at least some embodiments of the present disclosure. The illustrated gaming device 112 may correspond to an example of gaming device 112*a*, gaming device 112*b*, mobile device 120, and/or any other computational device depicted or described herein.

A gaming device 112 may correspond to a portable or non-portable device used for executing a gaming application or multiple different gaming applications without departing from the scope of the present disclosure. Non-limiting examples of a gaming device 112 include an EGM, a VGM, EGT, EGT player station, VR gaming machine, AR gaming machine, a mobile communication device (e.g., a smartphone, laptop, wearable device, etc.), a laptop, a PC, etc. The illustrative gaming device 112 depicted herein may include a support structure, housing or cabinet, which provides support for a plurality of displays, inputs, controls and other features of a conventional gaming machine. In some embodiments, a player 124 plays gaming device 112 while sitting, however, the gaming device 112 is alternatively configured so that a player can operate it while standing, moving, or sitting. The illustrated gaming device 112 can be positioned on the floor but can be positioned alternatively (i) on a base or stand, (ii) as a pub-style table-top game, (iii) as a stand-alone computational device on the floor of a casino with other stand-alone computational devices, or (iv) in any other suitable manner. The gaming device 112 can be constructed with varying cabinet and display configurations.

The gaming device 112 is shown to include a processor 204, memory 208, a user interface 212, and a network interface 216. In some embodiments, the processor 204 may correspond to one or many microprocessors, CPUs, microcontrollers, Integrated Circuit (IC) chips, or the like. For instance, the processor 204 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 204 may be provided as a microcontroller, microprocessor, Central Processing Unit (CPU), a Graphics Processing Unit (GPU), or plurality of microprocessors that are configured to execute the instructions sets stored in memory 208. In some embodiments, the instruction sets stored in memory 208, when executed by the processor 204, may enable the gaming device 112 to provide gameplay functionality.

The nature of the network interface 216 may depend upon whether the network interface 216 is provided in cabinet- or player station-style gaming device 112 or a mobile gaming device 120. Examples of a suitable network interface 216 include, without limitation, an Ethernet port, a USB port, an RS-232 port, an RS-485 port, a NIC, an antenna, a driver circuit, a modulator/demodulator, etc. The network interface 216 may include one or multiple different network interfaces depending upon whether the gaming device 112 is connecting to a single gaming network 104 or multiple different types of gaming networks 104. For instance, the gaming device 112 may be provided with both a wired and wireless network interface 216 without departing from the scope of the present disclosure.

The user interface 212 may include a combination of user input devices and user output devices. For instance, the user interface 212 may include a display screen, speakers, buttons, levers, a touch-sensitive display, or any other device that is capable of enabling player 124 interaction with the gaming device 112. The user interface 212 may also include one or more drivers for the various hardware components that enable player 124 interaction with the gaming device 112.

The memory 208 may include one or multiple computer memory devices that are volatile or non-volatile. The memory 208 may include volatile and/or non-volatile memory devices. Non-limiting examples of memory 208 include Random Access Memory (RAM), Read Only Memory (ROM), flash memory, Electronically-Erasable Programmable ROM (EEPROM), Dynamic RAM (DRAM), etc.

The memory 208 may be configured to store the instruction sets depicted in addition to temporarily storing data for the processor 204 to execute various types of routines or functions. The instruction sets can enable user interaction with the gaming device 112 and game play at the gaming device 112. Examples of instruction sets that may be stored in the memory 208 include a game control instruction set 244, wager credit meter instruction set 248, player interaction instruction set 252, loyalty point award instruction set 256, event monitor instruction set 260, an NFT management instruction set 264, a digital wallet interaction instruction set 268, and a communication instruction set 276. In addition to the instruction sets, the memory 208 may also be configured to store a random number generator or pseudorandom number generator (not shown) that is used by the game control instruction set 244, for example, to provide game outputs or support the game control instruction set 244 in generating such game outputs. The digital wallet interaction instruction set 268 is shown to include NFT collection information 272, which may include information describing one or more NFTs that are owned/possessed by a player 124 utilizing the gaming device 112. Alternatively or additionally, the NFT collection information 272 may include information describing an NFT collection that is associated with a game offered by the gaming device 112, how NFTs within the NFT collection can be earned and/or redeemed, and/or whether such NFTs (or the entire NFT collection) unlock certain gameplay features of the game when earned and redeemed by the player 124.

In some embodiments, one or more of the components listed above, such as the loyalty point award instruction set and promotional rules instruction set, would likely be implemented in a System Management Information Base ("SMIB") device and not natively in an Electronic Gaming Machine ("EGM") (or gaming device). Some of the components may be partly or entirely located on the system-side. For example, the loyalty point award instruction set may be implemented as an SMIB function or natively in the EGM hardware and/or software.

In some embodiments, the game control instruction set 244, when executed by the processor 204, may enable the gaming device 112 to facilitate one or more games with the player(s) 124. In some embodiments, the game control instruction set 244 may include subroutines that receive electronic messages from player(s) and others comprising an indication of consideration (e.g., a wager, mini wager, side wager, etc.) for occurrence of a predicted level of player performance in the game, subroutines that stream a video of the game to gaming and personal gaming devices 112, 120 of other non-players or third parties, subroutines that create, maintain and update player profiles of the player(s) to the game, subroutines that generate, such as by a random number generator or pseudorandom number generator, an outcome of the game, subroutines that alter, modify, or select game or display operations or functions in response to loyalty point awards and cryptocurrency exchanges with players, subroutines that calculate whether an outcome of the game has resulted in a win or loss during the game, subroutines for determining winnings and award payouts for the player(s) and others in the event of a win, subroutines for exchanging communications with another device, subroutines for determining whether certain game events correspond to NFT-earning events, and any other subroutine useful in connection with facilitating gameplay at the gaming device 112, 120.

The wager credit meter instruction set 248, when executed by the processor 204, may enable the gaming device 112 to facilitate a tracking of activity at the gaming system 100. In some embodiments, the wager credit meter 248 may be used to store or log information related to various player 124 activities and events that occur at the gaming device 112. The types of information that may be maintained in the wager credit meter instruction set 248 include, without limitation, player information, available credit information, wager amount information, whether one or more NFTs have been earned during gameplay, whether one or more NFTs (or a collection of NFTs) have been used to unlock gameplay features, whether one or more NFTs (or a collection of NFTs) have been used to modify game mechanics or game rules, whether one or more NFTs (or a collection of NFTs) have been used to change bonuses and/or pay tables, and other types of information that may or may not need to be recorded for purposes of accounting for wagers placed at the gaming device 112 and payouts made for a player 124 during a game of chance or skill played at the gaming device 112.

In some embodiments, the wager credit instruction set 218 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 112, NFT collection activities, NFT utilization activities, NFT transactions, and the like. In some embodiments, certain portions of the wager credit meter instruction set 248 may be updated in response to outcomes of a game of chance or skill played at the gaming device 112. In some embodiments, the gaming device 112 does not include a wager credit meter instruction set 248.

The player interaction instruction set 252 and event monitor instruction set 260, when executed by the processor 204, detect player activity at the gaming device 112 and notify the gaming server 116 of an instance of detected player 124 interaction, a type of player 124 interaction detected, and a timestamp associated with the player 124 interaction and enable the gaming device 112 to monitor operations of components of the gaming system 100 in response to interaction with players. The player gaming server 116 can use this input from the gaming device to determine loyalty point awards and determine a player's eligibility for earning NFTs, such as detecting a gaming event that enables the player to earn and/or redeem an NFT. Types of player interaction with the gaming device 112 can comprise, for example, physical contact of an input of the gaming device by a player 124 and/or a current credit balance maintained by the credit meter instruction set 248 associated with the gaming device 112.

The loyalty point award instruction set 256, when executed by the processor 204, applies the rules to the monitored operations to reward loyalty points to eligible players. The loyalty point award instruction set 256 further causes the processor 204 to increment and decrement loyalty point award balances for eligible players. For example, player 124 can be deemed to be eligible for loyalty points based upon amount of game play, type of game played (e.g., slots, blackjack, keno, etc.), amount of money spent or bet on game play, occurrence of a series of events or transactions involving a selected player at the game establishment, occurrence of a predetermined game event or sequence of events during one or more games (e.g., occurrence of a lucky coin event), redemption of NFTs, ownership of NFTs (or a collection of NFTs), occurrence of a system event (an event that is independent of a particular player's game play but involving multiple gaming devices or players (e.g., the game establishment realizing a determined threshold of gaming activity throughout the gaming system, occurrence of a determined time of day or day of week, and the like), and/or occurrence of a random event generated by the random number generator or pseudo random number generator (e.g., output of a predetermined random number entitles all players of a selected rank or class (e.g., gold or silver players) but not players of another rank or class (e.g., silver) to receive and loyalty points).

The NFT management instruction set 264, when executed by the processor 204, may enable the gaming device 112 to transfer NFTs to a player's 124 digital wallet, enable gameplay features based on NFTs (or a collection of NFTs) owned by the player 124, determine which NFTs (or collection of NFTs) are owned by the player 124, interact with the digital ledger 148, reference the digital ledger 148, and the like. Although depicted on the gaming device 112, it should be appreciated that some or all functionality of the NFT management instruction set 264 may be maintained at the gaming server 116, a gaming device 112, a mobile device 120, or the like. In other words, a player's 124 mobile device 120 may be equipped to support NFT management much like the gaming device 112.

The communication instruction set 276, when executed by the processor 204, may enable the gaming device 112 to communicate with the gaming server 116, a mobile device 120, the digital ledger 148, the database(s) 164, or the like. In some embodiments, the communication instruction set 276 may include instructions that enable the gaming device 112 to pair with a personal gaming mobile device 120 and establish a communication channel with the personal gaming mobile device via the pairing. As an example, the communication instruction set 276 may include instructions that enable NFC, Bluetooth®, Wi-Fi, or other types of communication protocols. It should be appreciated that the communication instruction set 276 may also be updated to reflect when a personal gaming mobile device is paired with the gaming device 112 and such pairing information may include addressing information for the personal gaming device and/or identification information associated with the player 124 of the personal gaming mobile device. Alternatively or additionally, the communication instruction set 232 may enable the gaming device 112 to identify a player 124 of the personal gaming device, identify a loyalty account associated with the player 124 of the personal gaming device, exchange information (e.g., send or receive) with a loyalty application operating on the personal gaming device, determine information regarding NFT(s) owned by the player 124 (e.g., stored in the player's 124 digital wallet 128) or combinations thereof. In some embodiments, the communication instruction set 276 may be configured to operate or drive the network interface 216 to facilitate direct or indirect communications with a personal gaming device.

While shown as separate instruction sets, it should be appreciated that any of the game control instruction set 244, wager credit meter instruction set 248, player interaction instruction set 252, loyalty point award instruction set 256, event monitor instruction set 260, NFT management 264, and communication instruction set 276 may correspond to a subroutine of the game control instruction set 244 without departing from the scope of the present disclosure.

The gaming device 112 is further shown to include a ticket issuance device 220, a ticket acceptance device 224, a currency in device 228, a currency out device 232, and a card reader 236. The ticket issuance device 220 may be configured to print physical tickets, vouchers, or the like. The ticket acceptance device 224 may be configured to receive, scan, and/or recognize information from an input physical ticket, voucher, or cash. In some embodiments, the ticket issuance device 220 and ticket acceptance device 224 may operate in concert with a common piece of hardware that both accepts and produces physical tickets, vouchers, or the like. Tickets or vouchers printed by ticket issuance device 220 and recognizable by the ticket acceptance device 224 may correspond to physical lottery tickets, casino vouchers, paper coupons, and the like. Alternatively or additionally, the ticket issuance device 220 and/or ticket acceptance device 224 may be connected to ticket or cash reading hardware. In such an embodiment, the ticket issuance device 220 and ticket acceptance device 224 may operate as a driver and/or firmware component for the card reader.

Similarly, the currency in device 228 and currency out device 232 may include or operate in concert with a coin slot or any other type of coin delivery mechanism. The currency in device 228 and currency out device 232 may include hardware, drivers, or firmware that facilitate receiving or distributing tokens, coins, chips, etc. In some embodiments, the currency in device 228 may be configured to determine an amount of coins (an amount of tokens, an amount of chips, etc.), input at the coin slot and convert the values into credits for playing games. The currency out device 232 may correspond to hardware and software configured to output coins, tokens, chips, etc. if a player decides to cash out or convert playing credits back into coins, tokens, or chips, etc.

The card reader 236 may include hardware and/or software configured to read or accept any type of card, or portable credential (e.g., NFC, Bluetooth, Wi-Fi, etc.). In some embodiments, the card reader 236 may include hardware and/or software that enable contactless reading of a card, token, or portable credential. In some embodiments, the card reader 236 may include hardware and/or software that enable contact-based reading of a card, token, or portable credential (e.g., magstripe, chip reader, electrodes, card-receiving slot, etc.). It should be appreciated that the card reader 236 may be configured to receive and reader a card or portable credential, token, in any type of format (e.g., portable plastic card, magstripe card, key fob, etc.). It should also be appreciated that the card reader 236 may be configured to write information or data onto a card or portable credential. Furthermore, in some embodiments, the card reader 236 may be configured to read a player loyalty card in the form of a plastic credit-card shaped credential. In some embodiments, the card reader 236 may enable communications with a loyalty application operating on a player's personal gaming device.

The gaming device 112 may include one or more display devices 240 configured to render information, live video, communications windows, wagering interface windows, games, interactive elements, and/or other visual output to one or more display screens. The gaming device 112 may include one or more display controllers configured to control an operation of the display device 240. This operation may include the control of input (e.g., player input via the user interface 212, command input via the instruction sets in memory 208, combinations thereof, etc.), output (e.g., display, rendered images, visual game behavior, etc.) and/or other functions of the display device 240.

In an embodiment, the display device 240 comprises one or more display screens that are configured to selectively activate pixels and/or display elements to render one or more games, windows, indicators, interactive elements, icons, characters, lights, images, etc. Non-limiting examples of the display screen may include, but are in no way limited to, a liquid crystal display (LCD), a light-emitting diode (LED) display, an electroluminescent display (ELD), an organic LED (OLED) display, and/or some other two-dimensional and/or three-dimensional display. In some embodiments, the one or more display screens may be separated into a main display and a secondary display. In an embodiment, the display device 240 comprises head-mounted displays worn by the players 124 to view the augmented reality, augmented virtuality, or virtual reality computer-generated game environments.

The display device 240 may include a display driver, a power supply, an input/output, and/or other components configured to enable operation of the display device 240. The display driver may receive commands and/or other data provided by the processor 204 and one or more of the instruction sets in memory 208. In response to receiving the commands, the display driver may be configured to generate the driving signals necessary to render the appropriate images to the display screen. The power supply may provide electric power to the components of the display device 240. In some embodiments, the power supply may include a transformer and/or other electronics that prevent overloading, condition power signals, and/or provide backup power to the display device 240. The input/output may correspond to one or more connections for receiving or exchanging information and/or video from components of the gaming device 112. The input/output may include an interconnection to the network interface 216. By way of non-limiting example, the input/output may include a high-definition multimedia interface (HDMI) input, Ethernet, composite video, component video, H.264, or other video connection.

Figure 3:
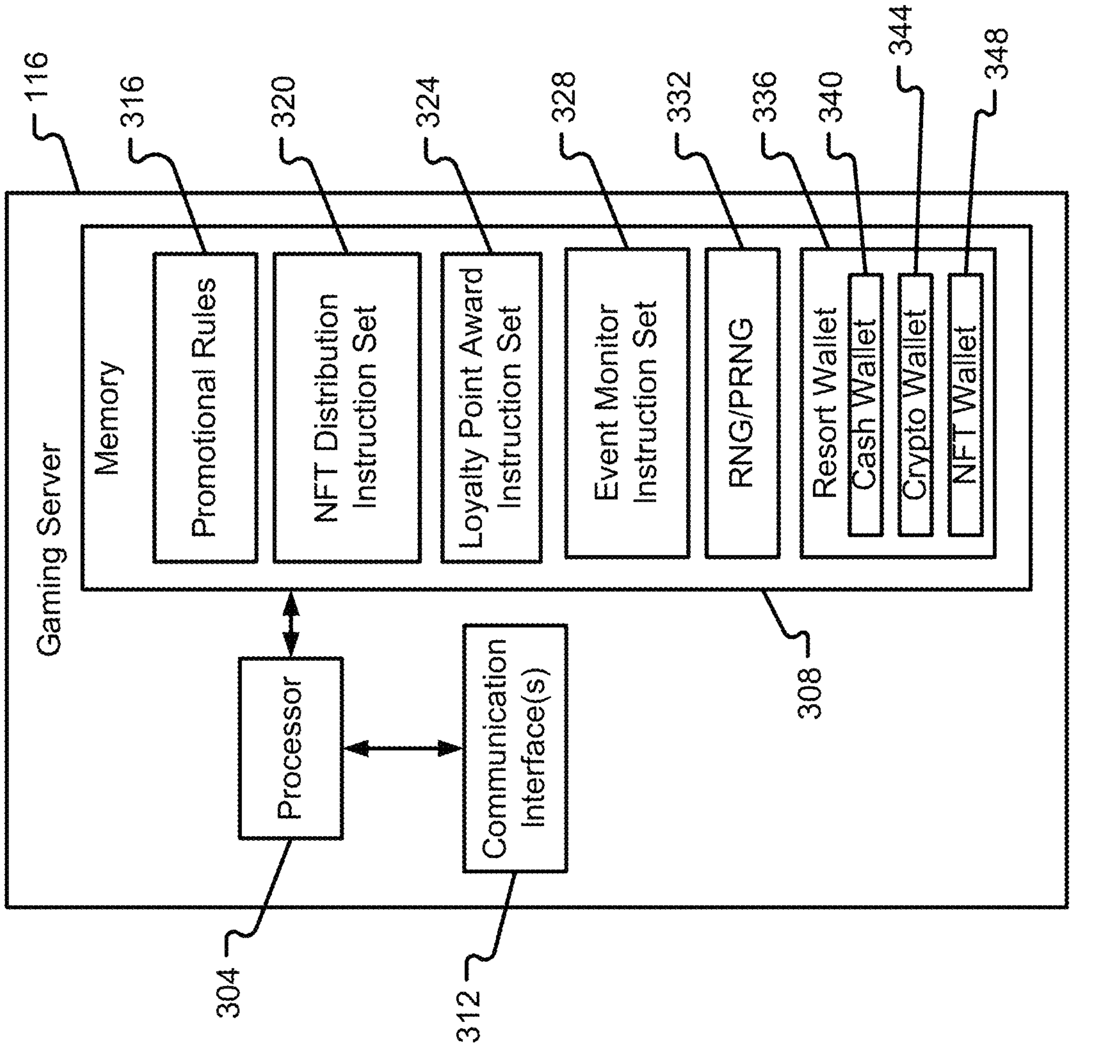
FIG. 3 is a block diagram depicting a gaming server in accordance with embodiments of the present disclosure.

With reference now to FIG. 3, additional details of a gaming server 116 will be described in accordance with embodiments of the present disclosure. The gaming server 116 is shown to include a processor 304, memory 308, and one or more communication interfaces 312. These resources may enable functionality of the gaming server 116 as will be described herein. For instance, a communication interface 312 may provide the gaming server 116 with the ability to send and receive communication packets or the like over the gaming network 104. The communication interface 312 can also facilitate communications with the mobile devices 120 via the communication network 108. The communication interface 312 may be provided as a network interface card (NIC), a network port, drivers for the same, and the like. Communications between the components of the gaming server 116 and other devices connected to the gaming network 104 may all flow through the communication interface 312.

The processor 304 may correspond to one or many computer processing devices. The processor 304 may be configured to execute one or more instruction sets stored in memory 308. Upon executing the instruction sets stored in memory 308, the processor 304 enables various authentication functions of the gaming server 116.

The memory 308 may include any type of computer memory device or collection of computer memory devices. The memory 308 may include volatile and/or non-volatile memory devices. Non-limiting examples of memory 308 include Random Access Memory (RAM), Read Only Memory (ROM), flash memory, Electronically-Erasable Programmable ROM (EEPROM), Dynamic RAM (DRAM), etc.

The illustrative instruction sets that may be stored in memory 308 include, without limitation, promotional rules 316, an NFT distribution instruction set 320, a loyalty point award instruction set 324, event monitor instruction set 328, RNG/PRNG 332, and digital resort wallet 336. Functions of the gaming server 116 enabled by these various instruction sets will be described in further detail herein. It should be appreciated that the instruction sets depicted in FIG. 3 may be combined (partially or completely) with other instruction sets or may be further separated into additional and different instruction sets, depending upon configuration preferences for the gaming server 116. Said another way, the particular instruction sets depicted in FIG. 3 should not be construed as limiting embodiments described herein. Although not depicted, the gaming server 116 may include instructions that enable a processor to store data into the database 164 and retrieve information from the database 164. Alternatively or additionally, the database 164 or data stored therein may be stored internal to the gaming server 116 (e.g., within the memory of the server 116 rather than in a separate database).

In some embodiments, the promotional rules 316 may correspond to rules that are referenced by other instruction sets in the gaming server 116 and/or by other gaming devices 112, 120. The promotional rules 316 may include rules associated with earning and/or redeeming NFTs as well as instructions defining how to mint NFTs for particular games or game symbols. In some embodiments, the promotional rules 316 may cooperate with the NFT distribution instruction set 320 to support the distribution of NFTs and collections of NFTs to different players 124 utilizing different types of devices. As an example, the NFT distribution instruction set 320 may refer to the promotional rules 316 to determine whether and when NFTs or NFT collections can be transmitted to digital wallets 128, 132 of players 124. In some embodiments, NFT collections may be displayed in a digital wallet 128, 132 of a player 124 even before NFTs belonging to the NFT collection have been earned and/or redeemed. The NFT distribution instruction set 320 may retrieve rules associated with earning and/or redeeming NFTs from the promotional rules 316, then depict such rules as part of a player's 124 digital wallet 128, 132. The player's digital wallet 128, 132 may then describe for the player 124 which games are associated with an NFT or NFT collection and how such NFT(s) can be earned and/or retrieved.

The event monitor instruction set 328, when executed by the processor 304, may be configured to monitor game events as they occur at various nodes of the system 100. Specifically, and without limitation, the event monitor instruction set 328 may monitor gameplay for the occurrence of a game event that corresponds to an NFT-earning event. If an NFT-earning event is detected within a game (according to promotional rules 316), then the event monitor instruction set 328 may notify the NFT distribution instruction set 320 of which device had the NFT-earning event and which NFT is eligible for redemption by the player 124 of the device.

The random number generator or pseudorandom number generator (RNG/PRNG) 332 is used to generate a random event as noted above. The RNG/PRNG 332 generates a distribution of numbers or game symbols (the random number value) that are not reasonably predictable by a random chance. Random number generators can be truly random hardware random generators (HRNGS), which generate random numbers as a function of current value of some physical environment attribute that is constantly changing in a manner that is practically impossible to model, or pseudorandom number generators (PRNGs), which generate numbers that look random, but are actually deterministic, and can be reproduced if the state of the PRNG were known. In some applications, the RNG/PRNG 332 uses computational algorithms that can produce long sequences of apparently random results, which are in fact determined by a shorter initial value, known as a seed value or key.

The loyalty point award instruction set 324 may be similar or identical to the loyalty point award instruction set 256 depicted and described in connection with FIG. 2. Illustratively, the loyalty point award instruction set 324 may cooperate with the loyalty point award instruction set 256 to determine if different NFTs or NFT collections are available to a player 124 based on that player's 124 loyalty status. In some embodiments, different NFTs or NFT collections may be earnable or redeemable by a player 124 depending upon the player's 124 loyalty status. Players 124 without a loyalty status may only be eligible to earn and redeem a first NFT or collection of NFTs whereas players 124 having certain higher loyalty status may be eligible to earn and redeem the first NFT or collection of NFTs as well as other NFTs and collections of NFTs.

In one embodiment, the RNG/PRNG 332 is a PRNG, which constantly generates a sequence of simulated random numbers, at a rate of hundreds or perhaps thousands per second. As soon as a "play" button is pressed or other game initiation is received from the player or a predetermined event occurs, the most recent random number is used to determine the result. This means that the result varies depending on exactly when the game is played. In other embodiments, the RNG/PRNG 332 is a cryptographic random number generator.

In some embodiments, the resort wallet 336 may be similar or identical to the digital resort wallet 132. The resort wallet 336 may include a cash wallet set of data structures 340 that tracks a cash balance and a cryptocurrency wallet set of data structures 344 that tracks cryptocurrency balances not only collectively for the gaming system 100 but also individually for each player's account managed by the gaming system 100. The resort wallet 336 may further include an NFT wallet 348, which tracks which NFT(s) are possessed by players 124, whether NFTs have been redeemed or not, whether players 124 are eligible to earn and/or redeem particular NFTs, whether NFT collections are active or expired (e.g., benefits associated with NFTs in the NFT collection enable gameplay features or not), etc. It should be appreciated that currency in the cash wallet 340 and/or cryptocurrency wallet 344 may be used to purchase or acquire one or more NFTs 348. Alternatively or additionally, one or more NFTs in the NFT wallet 348 may be transferred to other players 124 or back to the casino operator in exchange for credit in the cash wallet 340 and/or cryptocurrency in the cryptocurrency wallet 344. When cash or cryptocurrency is moved from a central resort wallet to a player's wallet, the appropriate data structures in each set of data structures are updated to reflect the transfer.

Figure 4:
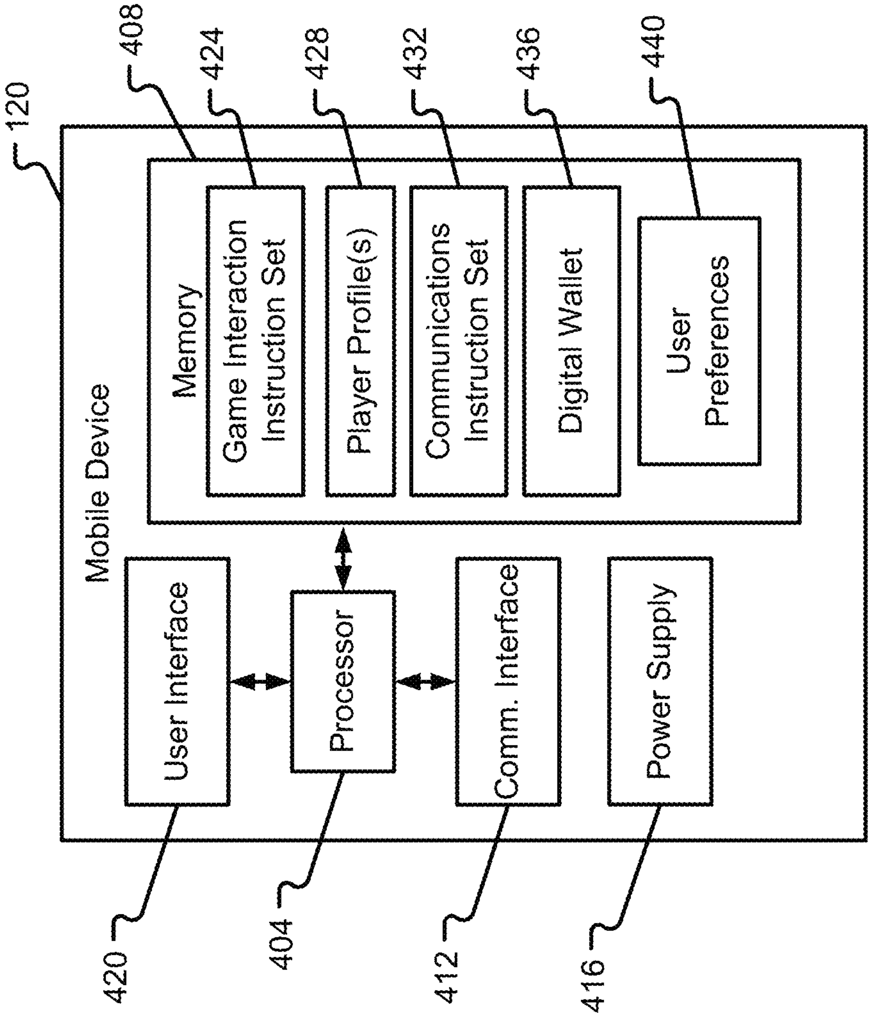
FIG. 4 is a block diagram depicting a mobile device in accordance with embodiments of the present disclosure.

With reference now to FIG. 4, additional details of the components that may be included in a mobile device 120 will be described in accordance with at least some embodiments of the present disclosure. Again, components of the mobile device 120 may be similar or identical to components of a gaming devices 112 and a mobile device 120 may be utilized as a gaming devices 112 in some embodiments.

The mobile device 120 is shown to include a processor 404, memory 408, a communication interface 412, and a user interface 420. In some embodiments, the processor 404 may be similar or identical to any of the other processors 204, 304 depicted and described herein and may correspond to one or many microprocessors, CPUs, GPUs, microcontrollers, Integrated Circuit (IC) chips, or the like. The processor 404 may be configured to execute one or more instruction sets stored in memory 408. In some embodiments, the instruction sets stored in memory 408, when executed by the processor 404, may enable the mobile device 120 to provide gameplay functionality, interact with gaming machines 112, pair with gaming machines 112, redeem NFTs, transfer NFTs, interact with a digital wallet 436, or any other type of desired functionality.

The communication interface 412 may be similar or identical to the network interface 216 and/or communication interfaces 312 depicted and described herein. The nature of the communication interface 412 may depend upon the type of communication network 108 for which the mobile device 120 is configured. Examples of a suitable communication interfaces 412 include, without limitation, a WiFi antenna and driver circuit, a Bluetooth antenna and driver circuit, a cellular communication antenna and driver circuit, a modulator/demodulator, etc. The communication interface 412 may include one or multiple different network interfaces depending upon whether the mobile device 120 is connecting to a single communication network 108 or multiple different types of communication networks. For instance, the mobile device 120 may be provided with both a wired communication interface 412 and a wireless communication interface 412 without departing from the scope of the present disclosure.

The user interface 420 may include a combination of a user input and user output device. For instance, the user interface 420 may include a display device, a microphone, a speaker, a haptic feedback device, a light, a touch-sensitive display, a button, or a combination thereof. The user interface 420 may also include one or more drivers for the various hardware components that enable user interaction with the mobile device 120.

The memory 408 may be similar or identical to other memory 208, 308 depicted and described herein and may include one or multiple computer memory devices that are volatile or non-volatile. The memory 408 may be configured to store instruction sets that enable player interaction with the mobile device 120 and that enable game play at the mobile device 120. Examples of instruction sets that may be stored in the memory 408 include a game interaction instruction set 424, player profile(s) 428, a communication instruction set 432, a digital wallet 436, and user preferences 440. In addition to the instruction sets, the memory 408 may also be configured to store data that is useable by the various instruction sets. Examples of such data that may be stored in memory 408 include, without limitation, contents of a digital wallet 436 (e.g., NFTs), instructions for interacting with a digital ledger 148, and the like.

In some embodiments, the game interaction instruction set 424, when executed by the processor 404, may enable the mobile device 120 to facilitate one or more games of chance or skill and produce interactions between the player and the game of chance or skill. In some embodiments, the game interaction instruction set 424 may include subroutines that present one or more graphics to the player 124 via the user interface 420, subroutines that calculate whether a particular wager has resulted in a win or loss during the game of chance or skill, subroutines for determining payouts for the player in the event of a win, subroutines for identifying NFT-earning events, subroutines for reporting NFT-earning events, subroutines for updating game rules and/or pay tables based on NFTs owned by a player 124 of the game, subroutines for exchanging communications with another device, such as the gaming server 116 and/or gaming device 112, subroutines for determining bonus gameplay opportunities during game play, and any other subroutine useful in connection with facilitating game play at the mobile device 120 and/or gaming device 112.

The player profile(s) 428 include a variety of player-specific data structures including player identification and login credentials. The player profile(s) 428 may also include user preferences 440, although the user preferences 440 are depicted as separate from the player profile(s) 438. The player profile(s) 428 may further include player loyalty status, an indication of which NFTs (or collection of NFTs) are owned by the player 124, etc.

The cryptocurrency wallet 154 comprises data structures related to the player's cryptocurrency wallet, including private and public keypair and seed used to generate the keys.

The communication instruction set 432, when executed by the processor 404, may enable the mobile device 120 to communicate via the communication network 108. In some embodiments, the communication instruction set 432 may be similar or identical to the communication instruction set 276 and may be particular to the type of communication network 108 used by the mobile device 120. As an example, the communication instruction set 432 may be configured to enable cellular, WiFi, and/or Bluetooth communications with other devices. The communication instruction set 432 may follow predefined communication protocols and, in some embodiments, may enable the mobile device 120 to remain paired with a gaming machine 112 as long as the mobile device 120 is within a predetermined proximity (e.g., 20-30 feet, an NFC communication range, or a Bluetooth communication range) and paired with the gaming machine 112. In some embodiments, the communication instruction set 432 enables a mobile device application of the mobile device to negotiate a secure, authenticated connection with the proper functionality, versions and security settings.

The user preferences 440 may correspond to gaming or wager preferences that are desired by the player 124 of the mobile device 120. In some embodiments, the user preferences 436 may comprise rules for automatically (or non-automatically) redeeming an NFT in response to an NFT-earning event occurring during a game. The gaming device 112 and mobile device 120 may be configured to communicate with one another and, in some embodiments, the mobile device 120 may provide some or all of the user preferences 436 to the gaming device 112 for use during a game play session or at least until the user 124 leaves the gaming device 112 (e.g., as determined by the mobile device 120 leaving the predetermined proximity of the gaming device 112).

The mobile device 120 is also shown to include a power supply 416. The power supply 416 may correspond to an internal power supply that provides AC and/or DC power to components of the mobile device 120. In some embodiments, the power supply 416 may correspond to one or multiple batteries. Alternatively or additionally, the power supply 416 may include a power adapter that converts AC power into DC power for direct application to components of the mobile device 120, for charging a battery, for charging a capacitor, or a combination thereof.

Figure 5:
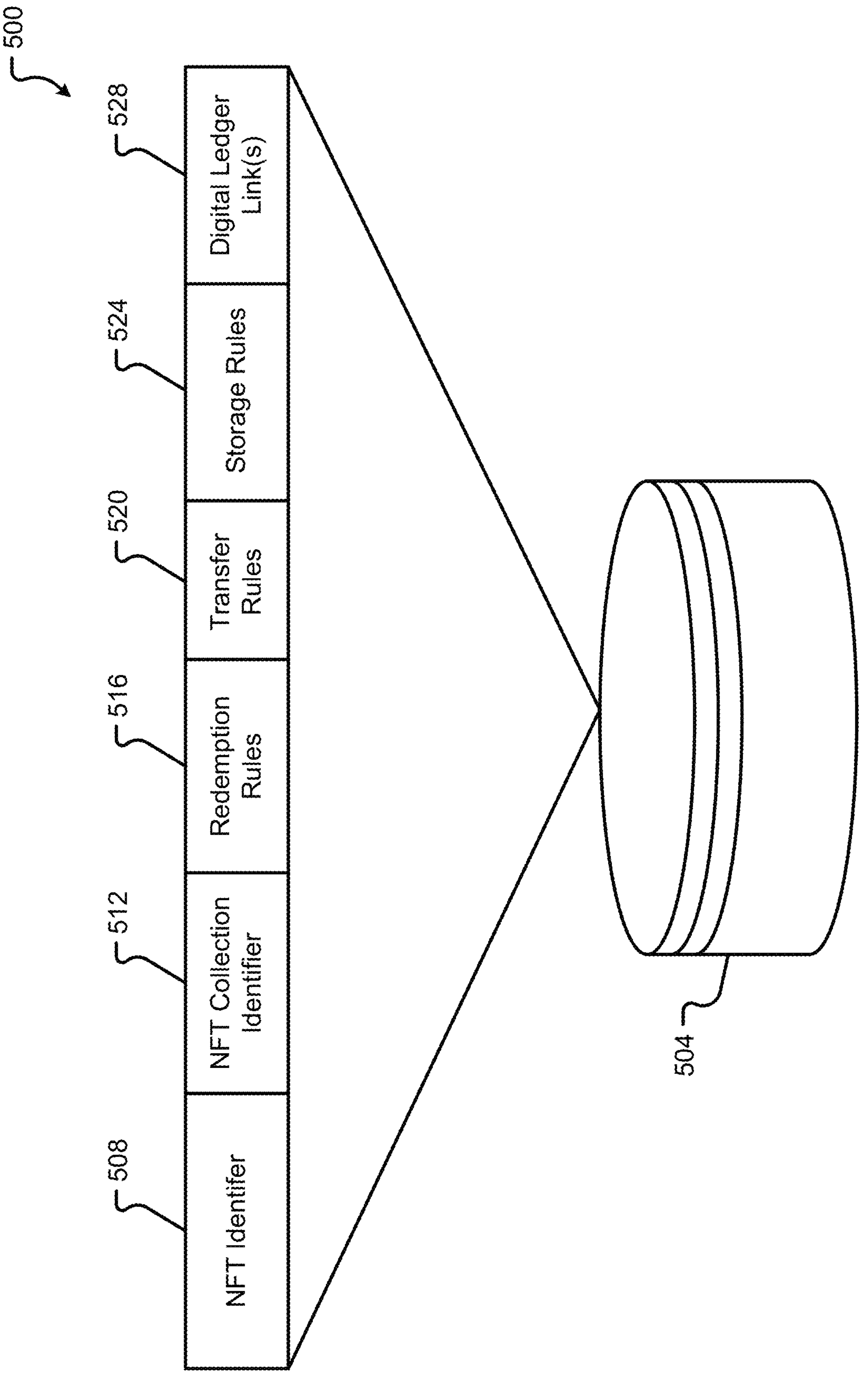
FIG. 5 is an illustrative data structure used for NFT management in accordance with embodiments of the present disclosure.

With reference now to FIG. 5, additional details of data that may be stored in a database 504 will be described in accordance with at least some embodiments of the present disclosure. The database 504 may be similar or identical to one or more of the database(s) 164. In some embodiments, the database 504 may be configured to store one or multiple data structures 500 that are used in connection with the management of NFTs and NFT collections. In some embodiments, the data stored in the data structures 500 may be stored for a plurality of different players, casinos, casino locations, games, devices, game types, etc. The data structures 500 may include a plurality of data fields that include, for instance, an NFT identifier field 508, an NFT collection identifier field 512, redemption rules 516, transfer rules 520, storage rules 524, and/or digital ledger link(s) 528.

The NFT identifier field 508 may be used to store any type of information that identifies an NFT. In some embodiments, the NFT identifier field 508 stores one or more of NFT name information, an identification number for an NFT, information describing a type of the NFT, a game (or games) associated with the NFT, a string that uniquely identifies the NFT from other NFTs, NFT tier information (e.g., information describing a tier value associated with the NFT), information describing whether the NFT has been earned and/or redeemed by a player 124, etc.

The NFT collection identifier field 512 may be used to store information describing an NFT collection (e.g., NFTs or types of NFTs that belong to an NFT collection), information describing each NFT belonging to the NFT collection, information describing whether a player 124 has redeemed particular (or all) NFTs in an NFT collection, a game (or games) associated with the NFT collection, etc. The NFT collection identifier field 512 may also store information describing gameplay feature(s) that can be unlocked or made available to a player 124 when all NFTs in the NFT collection have been redeemed by the player. Non-limiting examples of gameplay features may include at least one of a bonus game, a bonus spin, a different pay table, a payout, an adjusted reel spinning speed, a bonus award, a new symbol, a new game behavior, and a new game rule.

The redemption rules field 516 may be used to store information describing conditions for earning and/or redeeming an NFT or NFT collection. Illustratively, and without limitation, the redemption rules may include a definition of events or game events that need to occur to unlock the ability for a player 124 to earn and/or redeem an NFT or NFT collection. In some embodiments, a game event that may correspond to an NFT-earning event may include one or more of a 3-of-a-kind event, a 5-of-a-kind event, a jackpot event, a near-miss event, a cashing-in event, playing the game of chance for a predetermined amount of time, and a healthy player behavior event. It should be appreciated that other actions or non-game-events may also result in a player 124 becoming eligible to earn and redeem one or more NFTs. Illustrative, but non-limiting examples of actions that may be required of a player 124 to earn and redeem an NFT include movement actions required for the player 124 (e.g., requiring the player to physically move), enrollment actions required for the player 124 (e.g., requiring the player to open a loyalty account), healthy gaming actions (e.g., requiring the player to not play a game for a predetermined amount of time or for consecutive days), requiring the player 124 to utilize a particular denomination in a game, etc. The redemption rules may also define whether the player 124 is allowed to automatically redeem the NFT during gameplay or whether the player 124 must answer a prompt before redeeming the NFT.

The transfer rules field 520 and storage rules field 524 may be used to store information defining or controlling how an NFT may be stored, transferred, and/or redeemed. In some embodiments, the transfer rules field 520 may include information describing conditions required for a player 124 to redeem or transfer an NFT or NFT collection. In some embodiments, the transfer rules field 520 and/or storage rules field 524 may store information describing technical requirements of a digital wallet that must be met before an NFT or NFT collection can be stored or made eligible for storage.

The digital ledger link(s) field 528 may include information describing a location on the digital ledger 148 where a transaction associated with the NFT or NFT collection can be found. In some embodiments, the digital ledger link(s)

field 528 may include one or more blocks or references to blocks in a blockchain. The link(s) within the digital ledger link(s) field 528 may remain active as long as the NFT or NFT collection is active.

Figure 6:
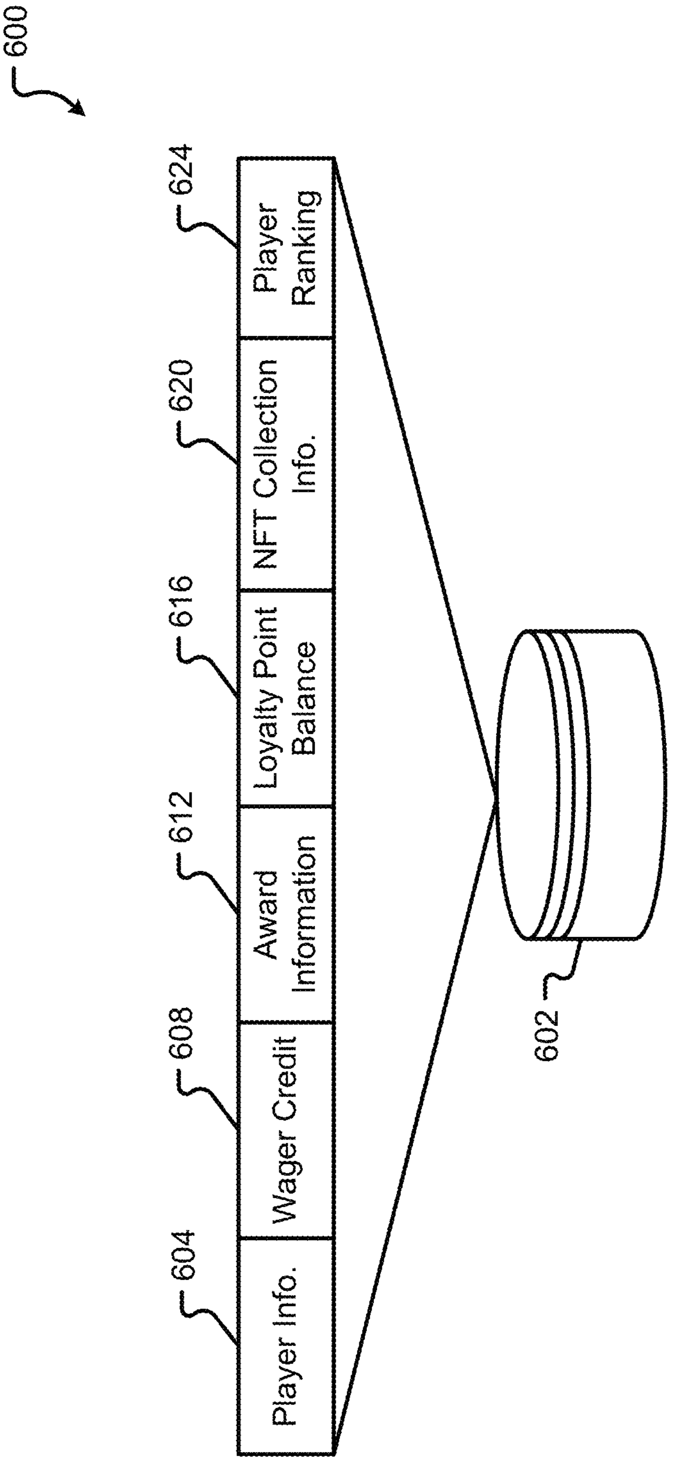
FIG. 6 is an illustrative data structure used in a player profile in accordance with embodiments of the present disclosure.

With reference now to FIG. 6, additional details of data that may be stored in a database 602 will be described in accordance with at least some embodiments of the present disclosure. The database 602 may be similar or identical to other databases 164, 504 and may be configured to store one or multiple data structures 600 that are used in connection with gaming activities of a player. In some embodiments, the data stored in the data structures 600 may be stored for a plurality of different player profiles or for a single player profile. The data structure 600 may include a plurality of data fields that include, for instance, a player information field 604, a wager credit field 608, award information and history field 612, loyalty points balance field 616, an NFT collection information field 620, and a player ranking field 624.

The player information field 604 may be used to store any type of information that identifies a player 124. In some embodiments, the player information field 604 may store one or more of username information for a player 124, contact information for the player (such as email address, phone number, social website webpage universal resource locator, and the like), password information for a player account, player status information, accommodations associated with the player 124, and any other type of customer service management data that may be stored with respect to a player 124.

The wager credit field 608 may be used to store data about a player's 124 available credit with the casino or a plurality of casinos. For instance, the wager credit field 608 may store an electronic record of available credit in the player's account and whether any restrictions are associated with such credit. The wager credit field 608 may further store information describing a player's available credit over time, wagers made over time, cash out events for the player, winning events for the player, and the like.

The award information and history field 612 may be used to store information describing awards that have been paid to the player 124 or that are available to be paid in response to particular events occurring within the gaming system 100. As a non-limiting example, the award information and history field 612 may be used to store electronic records for values of awards that are available to or have been paid to the player 124. The award information and history field 612 may further store information describing NFTs or NFT collections that have been awarded to and redeemed by a player 124. The award information and history field 612 may also store data related to awards, bonuses, mini bonuses, jackpots, side bets, etc. granted to the player 124. The award information and history field 612 may also indicate when such awards were granted to the player 124, whether the awards have been redeemed, whether the awards are being funded by a game of chance or skill, a mini bonus associated with an event, or a side bet award associated with the occurrence or nonoccurrence of an event.

The loyalty points balance field 616 may be used to store current loyalty point balances by type of loyalty points for the corresponding player 124. The loyalty point balance field 616 is incremented and decremented as loyalty points are added to and removed from the player's loyalty account. Information in the loyalty point balance field 616 may be used to update which NFTs or NFT collections are available to a player 124.

The NFT collection information field 620 may be used to store information describing NFTs or NFT collections that are earnable and/or redeemable by a player 124. Alternatively or additionally, the NFT collection information field 620 may store information indicating which, if any, NFTs or NFT collections are possessed by a player 124. In some embodiments, the NFT collection information field 620 may include a link to a digital wallet of the player and contents of the digital wallet. The NFT collection information field 620 may also be referenced to determine which, if any, NFTs were previously owned by a player 124, but were then transferred.

The player ranking field 624 may be used to store a player ranking associated with the corresponding player 124. Player ranking may be measured in various ways. In one embodiment, the player ranking is based on membership in a platinum, gold, silver, or bronze class, with platinum being the highest value to the casino and bronze the lowest. In one embodiment, the player ranking is based on a proficiency level or performance rank in one or more gaming sessions. Other player loyalty classification schemes are possible depending on the application.

Figure 7:
FIG. 7 illustrates a user interface depicting a digital wallet in accordance with embodiments of the present disclosure.
Figure 8:
FIG. 8 illustrates a user interface depicting a digital wallet in accordance with embodiments of the present disclosure.

Referring now to FIGS. 7 and 8, various possible configurations of a display 700 used to illustrate an NFT collection 704 and NFTs associated with the collection will be described in accordance with at least some embodiments of the present disclosure. The display 700 may be provided as part of a user interface and may be presented to a user as a view in their digital wallet. As a non-limiting example, the display 700 may present user interface objects that represent contents of a digital wallet 128, 132. Specifically, and without limitation, the NFT collection 704 may be presented as a view into the NFT wallet 160.

In some embodiments, the NFT collection 704 may include one, two, three, four, . . . , twenty, or more NFTs 708. In the illustrated example, and or ease of conversation, the NFT collection 704 is shown to include a first NFT 708*a*, a second NFT 708*b*, and a third NFT 708*c*. The display 700 may illustrate the NFT collection 704 and provide one or more visual indicators showing which NFTs have been redeemed and which NFTs have not been redeemed. More specifically, the view provided in FIG. 7 illustrates that the first NFT 708*a* and the third NFT 708*c* have not yet been redeemed by showing the NFTs 708*a*, 708*c* in grayscale. Other types of visual indicators, such as transparency, semi-transparency, shading, shadowing, highlighting, dotted lines, alternative coloring schemes, printed text indicators, or the like, may be used to indicate that an NFT in the NFT collection 704 has not been redeemed and, therefore, is not currently in the player's 124 digital wallet 128, 132.

Conversely, the NFT collection 704 may also provide a visual indication when an NFT, such as the second NFT 708*b*, has been redeemed by the player 124 and is stored in the player's digital wallet 128, 132. An indication of ownership may be provided with a number of different visual indicators, which may be similar, identical, or opposite to the indicator(s) used to show an NFT in the NFT collection 704 has not been redeemed. Illustratively, and without limitation, when an NFT in the NFT collection 704 has been earned and redeemed by the player 124, the NFT (e.g., the second NFT 708*b* as shown in FIG. 7) may be highlighted with coloring to indicate that it has been redeemed and is owned by the player 124. Moreover, NFT information may be provided as part of the display of the NFT 708*b*. The NFT information presented in the digital wallet (e.g., with a presentation via the object in the display 700) may include an NFT identifier, an NFT tier associated with the NFT, gameplay features unlocked by the NFT, and the like.

As can be seen in FIG. 8, when all NFTs 708*a*, 708*b*, 708*c* in the NFT collection 704 have been redeemed, then the entire NFT collection 704 may become highlighted to indicate that the NFT collection 704 is owned by the player 124. Ownership of all NFTs 708*a*, 708*b*, 708*c* in the NFT collection 704 may enable the player 124 to unlock additional gameplay features, access additional NFT tokens, access additional NFT collections, and the like. When an NFT has not yet been collected by a player 124, then requirements for earning the NFT may be presented in the player's 124 digital wallet. Examples of requirements that may be presented in the digital wallet include, without limitation, an objective within a game of chance, a game event that occurs within the game of chance, playing the game of chance at a particular time, playing the game of chance a predetermined number of times, playing the game of chance at a predetermined location, playing a bonus game within the game of chance, and playing the game of chance using at least a minimum denomination.

Once the NFT has been redeemed by the player 124 or the entire NFT collection 704 has been redeemed by the player 124, then information describing the NFT or the NFT collection 704 may be presented. As noted above, information describing the NFT or the NFT collection 704 may include the NFT identifier, games associated with the NFT or the NFT collection 704, gameplay features unlocked by the NFT or the NFT collection 704, a description of the NFT or the NFT collection 704, and the like.

Figure 9:
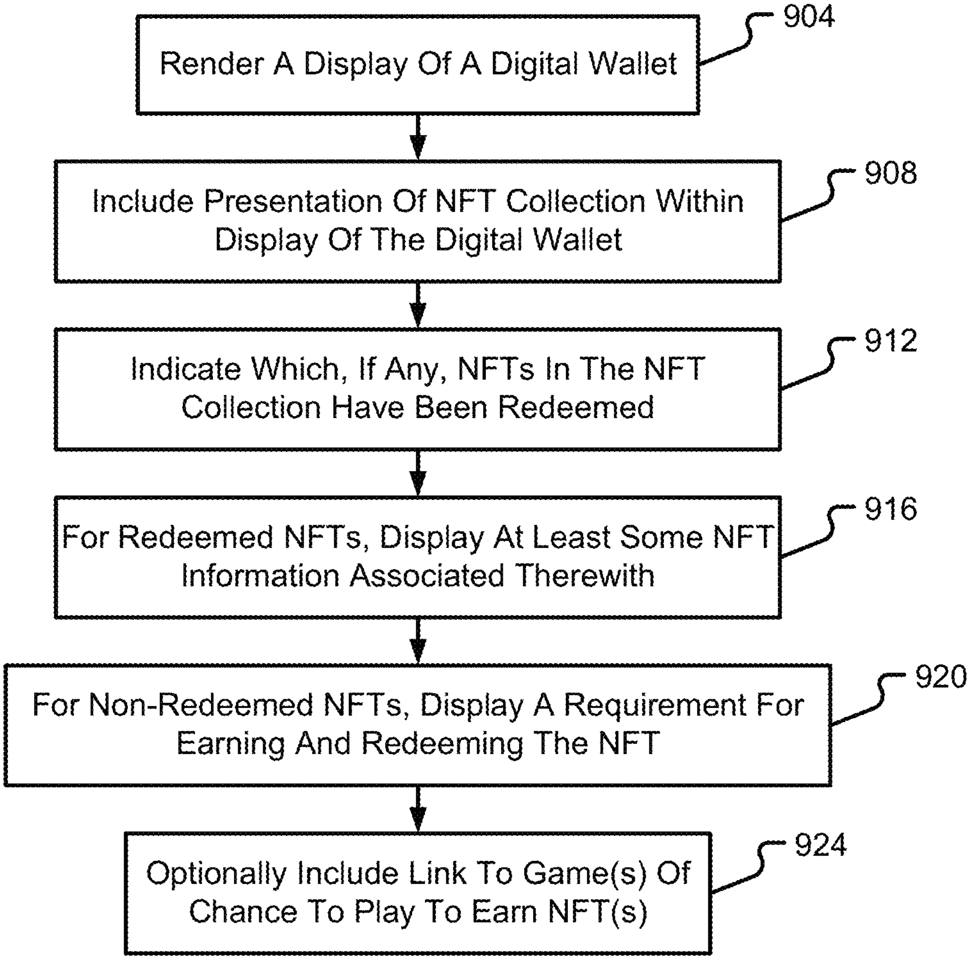
FIG. 9 is a flow diagram illustrating a method of earning and redeeming NFTs in an NFT collection in accordance with embodiments of the present disclosure.

Referring now to FIG. 9, additional details of a method of earning and redeeming NFTs in an NFT collection will be described in accordance with embodiments of the present disclosure.

The method begins by rendering a display of a digital wallet (step 904). The display of the digital wallet may include a presentation of contents of the digital wallet and the digital wallet may correspond to a personal digital wallet 128 of a player 124 or the digital wallet may correspond to a digital resort wallet 132. Part of the digital wallet 128, 132 may include an NFT wallet 160 in which icons or user interface objects of NFTs (earned and not earned) are depicted.

In some embodiments, the method may include presenting an NFT collection 704 within the NFT wallet 160 (step 908). The presentation of the NFT collection 704 may include icons or user interface objects for one or multiple NFTs belonging to the NFT collection 704. In some embodiments, each NFT depicted as being associated with the NFT collection 704 may include an indicator that identifies whether or not the NFT has been redeemed (step 912). Before gameplay begins or when a new NFT collection 704 has been released, it is possible and likely that none of the NFTs in the NFT collection 704 are possessed by the player 124. In such a situation, every NFT in the NFT collection 704 may include an indicator showing that the NFT is not yet possessed by the player 124 (e.g., not stored in the player's 124 digital wallet).

As time goes on and the player 124 earns and redeems one or more NFTs in the NFT collection 704, the method may continue by displaying at least some information for an NFT when redeemed (step 916). Illustratively, and without limitation, redeemed NFTs (e.g., NFTs that are possessed by the player 124 and stored in the player's 124 digital wallet) may include an indicator showing their status as redeemed. Moreover, redeemed NFTs may also have information presented therewith describing a game of chance associated with the NFT, an NFT tier value associated with the NFT, gameplay features unlocked by the NFT, and the like.

For non-redeemed NFTs in the NFT collection 704, information describing a requirement for earning and redeeming the NFT(s) may be presented in the digital wallet (step 920). As a non-limiting example, the requirement may refer the player 124 to a game (e.g., a game of chance) in which the NFT can be earned. Further still, the requirement may define an event that must occur within the game such that the player 124 becomes eligible to earn and redeem the NFT.

In some embodiments, the method may further include presenting a hyperlink to the game of chance with which the non-redeemed NFT is associated (step 924). The hyperlink may provide a mechanism for the player 124 to navigate on their mobile device 120 from their digital wallet 128 to the game of chance that can be played to earn and redeem a particular NFT. Alternatively or additionally, the digital wallet and the non-redeemed NFT may be presented to the player 124 via a gaming device 112 and instructions for earning the NFT within a game offered by the gaming device 112 may be presented within the digital wallet along with a presentation of the user interface object for the non-redeemed NFT.

Figure 10:
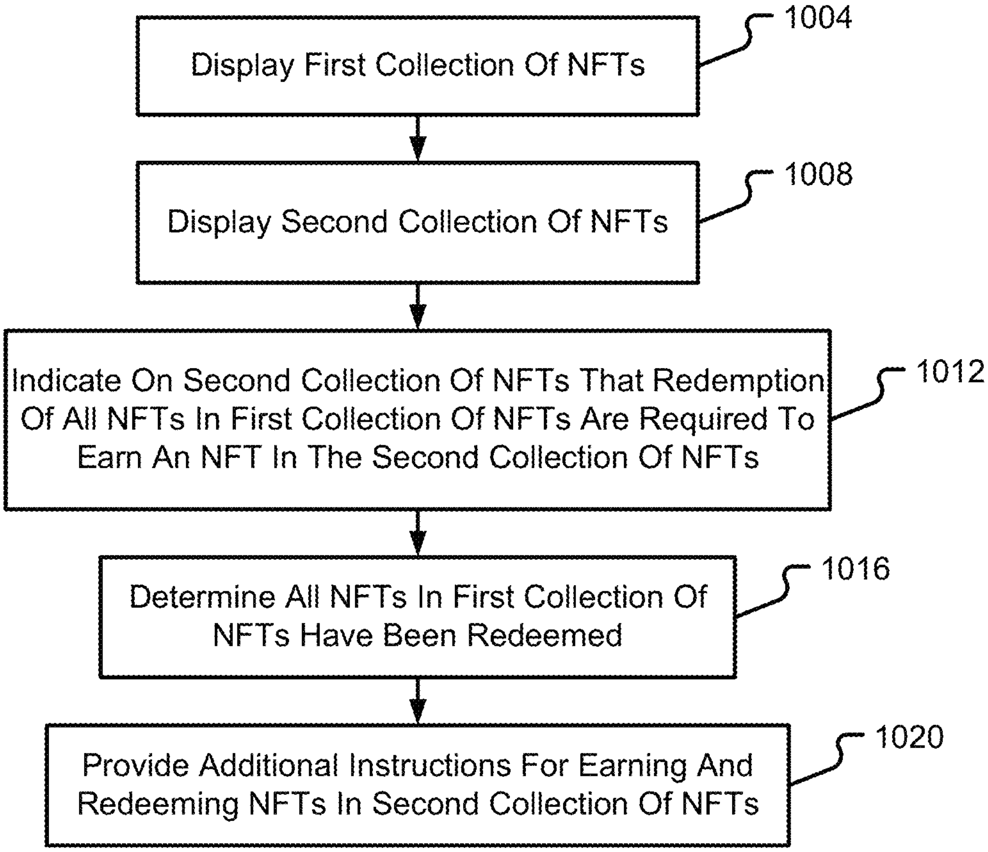
FIG. 10 is a flow diagram illustrating a method of earning and redeeming multiple NFT collections in accordance with embodiments of the present disclosure.

Referring now to FIG. 10, additional details of a method of earning and redeeming multiple NFT collections will be described in accordance with embodiments of the present disclosure.

The method begins by displaying a first collection of NFTs (step 1004). The first collection of NFTs may include one, two, three, four, or more NFTs therein. The display of the first collection of NFTs may be provided in a digital wallet or by a game of chance associated with the first collection of NFTs.

The method continues by displaying a second collection of NFTs (step 1008). In some embodiments, the second collection of NFTs may include one, two, three, four, or more NFTs therein. The NFTs in the first collection of NFTs may be different from the NFTs in the second collection of NFTs, meaning that no NFT in the first collection of NFTs is also in the second collection of NFTs. The display of the second collection of NFTs may be provided alongside the presentation of the first collection of NFTs and may be provided in a digital wallet or by a game of chance associated with the second collection of NFTs. In some embodiments, the first collection of NFTs may be associated with a first game whereas the second collection of NFTs may be associated with a second game that is different from the first game.

The method may continue by indicating on the second collection of NFTs that redemption of all NFTs in the first collection of NFTs are required to earn an NFT in the second collection of NFTs (step 1012). Said another way, a requirement for earning any NFT in the second collection of NFTs may include collecting all NFTs in the first collection of NFTs. Unless and until all NFTs in the first collection of NFTs have been collected by the player 124, the player 124 may be prohibited from collecting any NFT in the second collection of NFTs.

The method may continue by determining that all NFTs in the first collection of NFTs have been redeemed (step 1016). Once it has been determined that all NFTs in the first collection of NFTs have been redeemed by the player 124, then the display of the second collection of NFTs may be updated to include additional instructions for earning and redeeming one, some, or all of the NFTs in the second collection of NFTs (step 1020). In other words, in response to determining that all NFTs in the first collection of NFTs are stored in the digital wallet, the second collection of NFTs may be unlocked for the player to earn. In this process, the player's 124 digital wallet may be updated, thereby causing the digital wallet to display candidate NFTs that belong to the second collection of NFTs. Then the digital wallet may be provided with an option for the player to select the option and redeem an additional gameplay feature based on collecting all NFTs in the second collection of NFTs.

It should be appreciated that additional gameplay features may be made available by collecting all NFTs in the second collection of NFTs as compared to gameplay features made available by collecting all NFTs in the first collection of NFTs. Some or both collections of NFTs may provide the player 124 with access to additional gameplay features. One or both collections of NFTs may also comprise an expiry timer associated therewith that, when expired, triggers the associated gameplay features to become unusable within the game. Even when an NFT or collection of NFTs has expired, it should be appreciated that the digital wallet may still present the user interface objects for the NFTs and the NFTs may still be owned/possessed by the player 124. The features associated with the NFTs or the collection of NFTs, however, may become expired and no longer available to the player 124.

Figure 11:
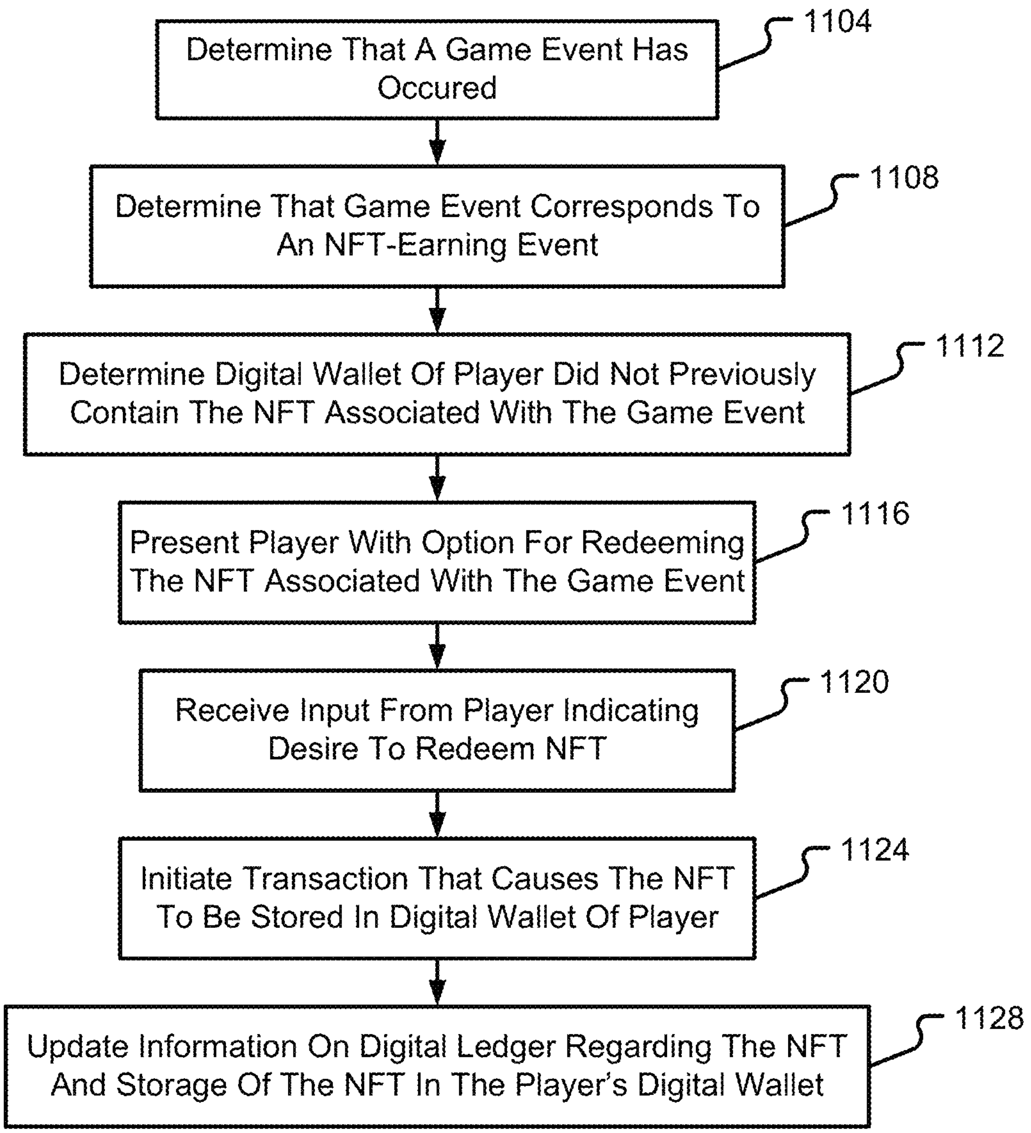
FIG. 11 is a flow diagram illustrating a method of recording an NFT transaction in accordance with embodiments of the present disclosure.

Referring now to FIG. 11, additional details of a method of recording an NFT transaction will be described in accordance with embodiments of the present disclosure.

The method begins by determining a game event has occurred during a game of chance (step 1104). The determination may be made by a game control instruction set, an event monitor instruction set, an NFT management instruction set, an NFT distribution instruction set, or the like. The game event may correspond to one or more of a 3-of-a-kind event, a 5-of-a-kind event, a jackpot event, a near-miss event, a cashing-in event, playing the game of chance for a predetermined amount of time, and a healthy player behavior event.

The method may continue by determining the game event corresponds to an NFT-earning event (step 1108). The method may also include determining that the digital wallet of the player 124 did not previously contains the NFT associated with the game event (e.g., the NFT-earning event) (step 1112). The determination of the player's 124 digital wallet contents may be made by querying the player's 124 digital wallet or by referencing a digital ledger 148 on which NFT transactions are recorded. Based on the query of the player's 124 digital wallet and/or based on a query of the digital ledger 148, the device making the determination of the player's 124 NFT possessions may determine that the player 124 has not yet earned and/or redeemed the NFT associated with the game event. In some embodiments, the NFT-earning event may enable the player to receive a first NFT based on the occurrence of the NFT-earning event when the player 124 was playing the associated game. The first NFT may correspond to one of multiple NFTs in a collection of NFTs.

Upon determining that the player 124 is eligible to earn and redeem the first NFT and in response to determining that the player 124 does not yet possess or own the first NFT, the method may continue by presenting the player 124 with an option for redeeming the first NFT (step 1116). In some embodiments, the option is presented by the device on which the player 124 is playing the game. In some embodiments, the option is presented by the device on which the player's 124 digital wallet resides. In some embodiments, the option may be presented on multiple devices, particularly when the player 124 is playing a game on a gaming device 112 and the player's 124 mobile device 120 is paired with the gaming device 120.

The method may continue when a player 124 response to the option is received and where the response indicates a desire for the player 124 to redeem the NFT (step 1120). In response to receiving such an input from the player 124 and in response to determining that the player 124 has not yet redeemed the NFT in the collection of NFTs, the method may initiate a transaction that causes the NFT to be stored in the digital wallet of the player 124 (step 1124). Concurrent with step 1124, before step 1124, or after step 1124, the method may include updating information on the digital ledger regarding the NFT redeemed by the player 124 and the storage of the NFT in the player's 124 digital wallet (step 1128). The transaction may be validated by another computational device in the system 100 prior to minting the NFT and/or completing the NFT transaction.

Figure 12:
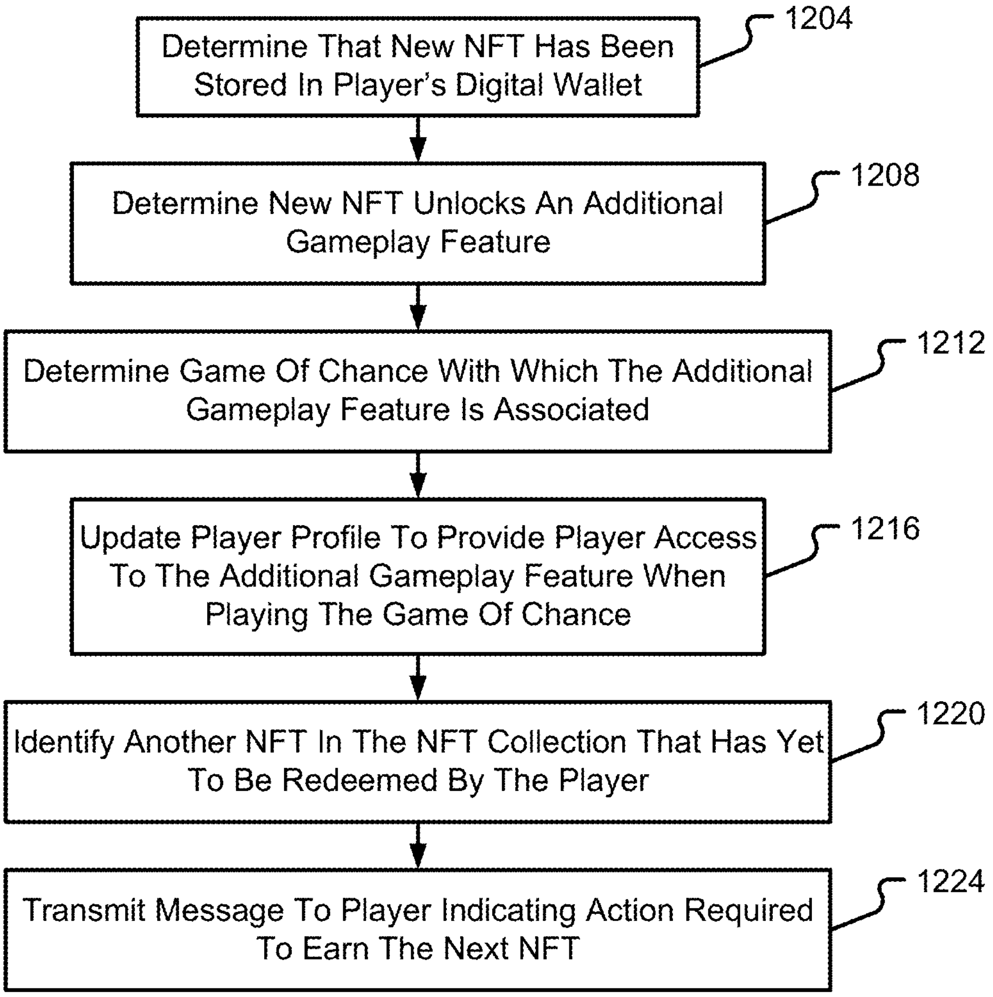
FIG. 12 is a flow diagram illustrating a method of enhancing player experiences with NFTs in accordance with embodiments of the present disclosure.

Referring now to FIG. 12, additional details of a method of enhancing player experiences with NFTs will be described in accordance with embodiments of the present disclosure.

The method begins by determining that a new NFT has been stored in the player's 124 digital wallet (step 1204). The method may then include determining that the new NFT unlocks an additional gameplay feature (step 1208). The gameplay feature unlocked by the new NFT may include one or more of a bonus game, a bonus spin, a different pay table, a payout, an adjusted reel spinning speed, a bonus award, a new symbol, a new game behavior, and a new game rule.

The method may also include determining a game of chance within which the additional gameplay feature is associated (e.g., is useable) (step 1212). A player profile associated with the player 124 may then be updated to provide the player 124 with access to the additional gameplay feature when the player 124 next plays the associated game (step 1216). In some embodiments, the associated game may correspond to a game of chance, a game of skill, or a hybrid game of chance and skill. Alternatively or additionally, the associated game may correspond to a bonus game of another game and the gameplay feature may only be usable within the execution of the bonus game.

The method may further include identifying another NFT in the collection of NFTs that the player 124 has yet to redeem (step 1220). In other words, the new NFT recently redeemed by the player 124 may belong to a collection of NFTs, which may include other NFTs that have not yet been redeemed by the player 124.

Upon identifying another NFT in the collection of NFTs that has yet to be redeemed by the player 124 (e.g., which is not stored in the player's 124 digital wallet), the method may continue by generating and transmitting a message to the player 124. The message may be displayed along with an indication of an action required by the player 124 to earn the next NFT (step 1224). When the next action is detected, then the player 124 may become eligible to earn and redeem the next NFT.

Figure 13:
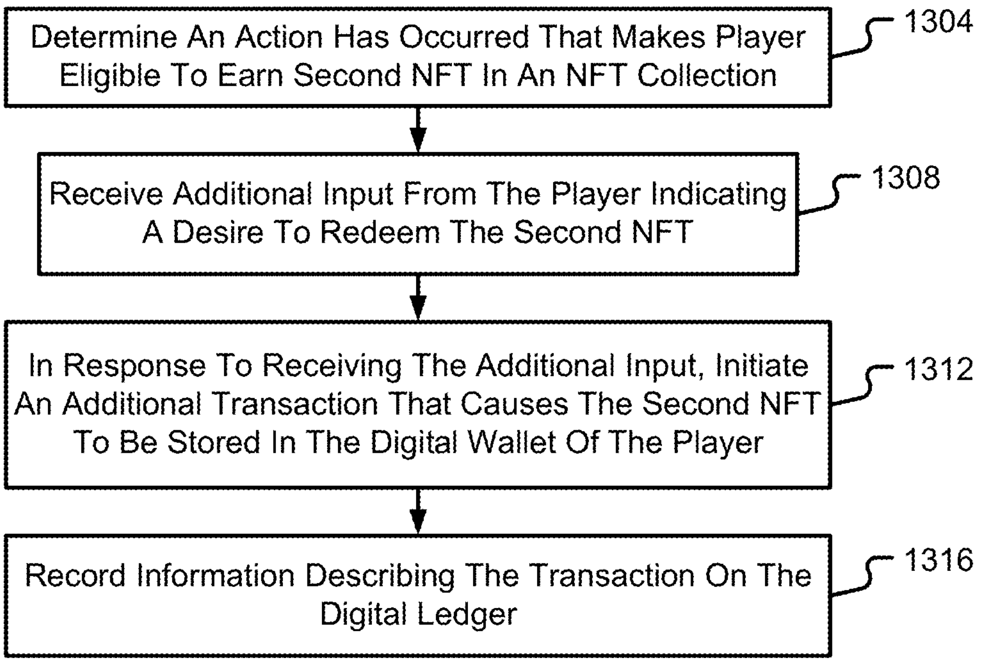
FIG. 13 is a flow diagram illustrating a method of earning additional NFTs from an NFT collection in accordance with embodiments of the present disclosure.

Referring now to FIG. 13, additional details of a method of earning additional NFTs from a collection of NFTs will be described in accordance with embodiments of the present disclosure.

The method may include determining that an action has occurred that makes the player 124 eligible to earn a second NFT in a collection of NFTs (step 1304). In some embodiments, the player 124 may already have earned another NFT (e.g., a first NFT) in the collection of NFTs. The action may correspond to a non-game event and/or to an additional game event that occurs in a game other than a game of chance. In other words, the first NFT in a collection of NFTs may be earned and redeemed in a first game whereas the second NFT in the collection of NFTs may be earned and redeemed in a second game. Alternatively, multiple or all NFTs in a collection of NFTs may be earned and redeemed in a common game, which may include a game of chance, a game of skill, or a hybrid game of chance and skill.

The method may also include receiving an additional input from the player 124 indicating a desire to redeem the second NFT in the collection of NFTs (step 1308). In response to receiving the additional input from the player 124, the method may further include initiating a transaction that causes the second NFT in the collection of NFTs to be stored in the digital wallet of the player 124 (step 1312). The method may further include recording information describing the NFT and the transaction on the digital ledger 148 (step 1316).

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, RAM, ROM, EEPROM or Flash memory, an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A system, comprising:

a processor; and computer memory coupled with the processor, the computer memory comprising data stored thereon that, when executed by the processor, causes the processor to:

determine that a game event has occurred during a game of chance;

determine that the game event corresponds to a Non-Fungible Token (NFT)-earning event and that a player playing the game of chance when the game event occurred is eligible to receive a first NFT based on the occurrence of the game event, wherein the first NFT is one of multiple NFTs belonging to an NFT collection;

receive an input from the player indicating a desire to redeem the first NFT;

query a digital wallet associated with the player;

determine, based on a response to the query, that the digital wallet did not contain the first NFT prior to receiving the input from the player;

in response to determining that the digital wallet did not contain the first NFT prior to receiving the input from the player, initiate a transaction that causes the first NFT to be stored in the digital wallet associated with the player and information describing the first NFT to be recorded to a digital ledger;

following storage of the first NFT in the digital wallet, determine that all NFTs in the NFT collection are stored in the digital wallet;

in response to determining that all NFTs in the NFT collection are stored in the digital wallet, enable an additional gameplay feature for the player; and in response to determining that all NFTs in the NFT collection are stored in the digital wallet, render a presentation of a new NFT collection that has been unlocked and made available to the player, wherein the presentation of the new NFT collection provides the player with instructions for earning each NFT in the new NFT collection.

2. The system of claim 1, wherein the instructions for earning each NFT in the new NFT collection include an indication for the player to perform an additional game event and for the player to perform a non-game event.

3. The system of claim 2, wherein the additional gameplay feature comprises one of the following: a bonus game, a bonus spin, an adjusted reel spinning speed, and a new symbol.

4. The system of claim 2, wherein the non-game event corresponds to use of a predetermined denomination.

5. The system of claim 2, wherein the additional game event occurs in a game other than the game of chance and wherein the game other than the game of chance is made available via a hyperlink presented in connection with the digital wallet.

6. The system of claim 1, wherein the digital wallet is stored in a mobile device of the player, wherein the query is transmitted from an Electronic Gaming Machine (EGM) to the mobile device, wherein the mobile device is paired with the EGM, and wherein the presentation of the new NFT collection is rendered on a display of the EGM.

7. The system of claim 1, wherein the game event comprises one of the following: a 3-of-a-kind event, a 5-of-a-kind event, a jackpot event, a near-miss event, a cashing-in event, and playing the game of chance for a predetermined amount of time.

8. The system of claim 1, wherein the additional gameplay feature is made available to the player within the game only in response to determining that all NFTs in the NFT collection are stored in the digital wallet and wherein the collection of NFTs comprises an expiry timer associated therewith that, when expired, triggers the additional gameplay feature to become unusable within the game.

9. The system of claim 1, wherein the data stored on the computer memory further causes the processor to:

determine a type of NFT for which the player is eligible based on a loyalty status associated with a loyalty account of the player; and present the first NFT according to the type of NFT for which the player is eligible based on the loyalty status associated with the player.

10. The system of claim 1, wherein the data stored on the computer memory further causes the processor to:

in response to determining that all NFTs in the NFT collection are stored in the digital wallet, unlock the new NFT collection as an additional NFT collection for the player to earn;

update the digital wallet and cause the digital wallet to display candidate NFTs that belong to the additional NFT collection; and provide the digital wallet with an option for the player to select the option and redeem an additional gameplay feature based on collecting all NFTs in the NFT collection.

11. The system of claim 1, wherein the input is received from the player via at least one of the game of chance and the digital wallet.

12. A method, comprising:

determining, with a processor, that a game event has occurred during a game of chance;

determining, with the processor, that the game event corresponds to a Non-Fungible Token (NFT)-earning event and that a player playing the game of chance when the game event occurred is eligible to receive a first NFT based on the occurrence of the game event, wherein the first NFT is one of multiple NFTs belonging to an NFT collection;

querying a digital wallet associated with the player;

determining, with the processor and based on a response to the query, that the digital wallet did not contain the first NFT prior to the player playing the game of chance;

in response to determining that the digital wallet did not contain the first NFT prior to receiving the input from the player, initiating a transaction that causes the first NFT to be stored in the digital wallet associated with the player and information describing the first NFT to be recorded to a digital ledger;

following storage of the first NFT in the digital wallet, determining that all NFTs in the NFT collection are stored in the digital wallet;

in response to determining that all NFTs in the NFT collection are stored in the digital wallet, enabling an additional gameplay feature for the player; and in response to determining that all NFTs in the NFT collection are stored in the digital wallet, rendering a presentation of a new NFT collection that has been unlocked and made available to the player, wherein the presentation of the new NFT collection provides the player with instructions for earning each NFT in the new NFT collection.

13. The method of claim 12, wherein the instructions for earning each NFT in the new NFT collection include an indication for the player to perform an additional game event and for the player to perform a non-game event.

14. The method of claim 13, the non-game event corresponds to use of a predetermined denomination.

15. The method of claim 13, wherein the additional game event occurs in a game other than the game of chance and wherein the game other than the game of chance is made available via a hyperlink presented in connection with the digital wallet.

16. The method of claim 12, wherein the digital wallet is stored in a mobile device of the player, wherein the query is transmitted from an Electronic Gaming Machine (EGM) to the mobile device, wherein the mobile device is paired with the EGM, and wherein the presentation of the new NFT collection is rendered on a display of the EGM.

17. The method of claim 12, wherein the game event comprises one of the following: a 3-of-a-kind event, a 5-of-a-kind event, a jackpot event, a near-miss event, a cashing-in event, and playing the game of chance for a predetermined amount of time.

18. The method of claim 12, wherein the additional gameplay feature is made available to the player within the game only in response to determining that all NFTs in the NFT collection are stored in the digital wallet and wherein the collection of NFTs comprises an expiry timer associated therewith that, when expired, triggers the additional gameplay feature to become unusable within the game.

19. The method of claim 12, further comprising:

determining a type of NFT for which the player is eligible based on a loyalty status associated with a loyalty account of the player; and presenting the first NFT according to the type of NFT for which the player is eligible based on the loyalty status associated with the player.

20. The method of claim 12, further comprising:

in response to determining that all NFTs in the NFT collection are stored in the digital wallet, unlocking the new NFT collection as an additional NFT collection for the player to earn;

updating the digital wallet and cause the digital wallet to display candidate NFTs that belong to the additional NFT collection; and providing the digital wallet with an option for the player to select the option and redeem an additional gameplay feature based on collecting all NFTs in the NFT collection.

* * * * *